United States Patent [19]

Lyke

[11] Patent Number: 4,754,488
[45] Date of Patent: Jun. 28, 1988

[54] METHOD FOR ASCERTAINING AND FILLING OF BOUNDED AREAS OF A COLORED RASTER DISPLAY

[75] Inventor: Christopher J. Lyke, Menlo Park, Calif.

[73] Assignee: International Business Machines Corporation, Armonk, N.Y.

[21] Appl. No.: 679,666

[22] Filed: Dec. 7, 1984

[51] Int. Cl.$^4$ .......................... G06K 9/00; G06F 3/00
[52] U.S. Cl. ........................ 382/22; 340/703; 340/747; 358/22; 358/80; 358/81; 382/17
[58] Field of Search .................. 382/26, 28, 9, 22, 60, 382/17; 340/703, 747, 728, 734; 364/518, 526; 358/22, 80, 81, 82

[56] References Cited

U.S. PATENT DOCUMENTS

| | | | |
|---|---|---|---|
| 3,987,412 | 10/1976 | Morrin II | 382/60 |
| 4,318,121 | 3/1982 | Taite et al. | 358/81 |
| 4,334,274 | 6/1982 | Aqui et al. | 382/9 |
| 4,521,909 | 6/1985 | Wang | 382/34 |
| 4,528,642 | 7/1985 | Waller | 340/747 |
| 4,566,124 | 1/1986 | Yamamoto et al. | 382/22 |
| 4,616,220 | 10/1986 | Grunewald et al. | 340/747 |
| 4,646,076 | 2/1987 | Wiedenman et al. | 340/703 |
| 4,646,078 | 2/1987 | Knierim et al. | 340/747 |
| 4,667,306 | 5/1987 | Smith | 340/747 |

OTHER PUBLICATIONS

Appel and Evangelisti, "Automatic Filling of Bounded Areas in Raster Display", IBM Technical Disclosure Bull., vol. 21, No. 3, pp. 1300–1303.

Primary Examiner—Leo H. Boudreau
Attorney, Agent, or Firm—R. Bruce Brodie

[57] ABSTRACT

A method for use in a bit-mapped presentation display system for ascertaining the boundary of an arbitrarily-shaped closed polygon filled with a first color-coded pel pattern and then filling the ascertained polygon with a second color-coded pel pattern. The method steps comprise identifying the first color-coded pattern; determining all unique raster runs of said identified first pattern, and creating a counterpart data representation thereof; and filling in at least a portion of the raster color-coded domain with the second pattern as controlled by the data representation.

3 Claims, 7 Drawing Sheets

INTERACTIVE DISPLAY SYSTEM

OBJECT OF ONE COLOR IN DOMAIN OF SECOND COLOR

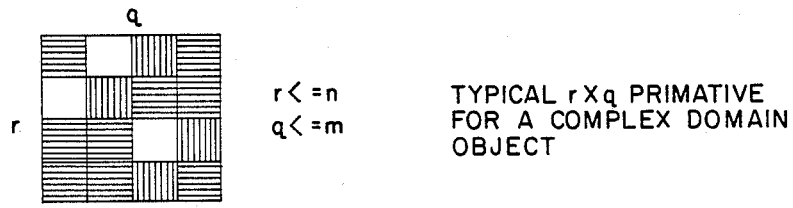
TYPICAL r X q PRIMATIVE
FOR A COMPLEX DOMAIN
OBJECT
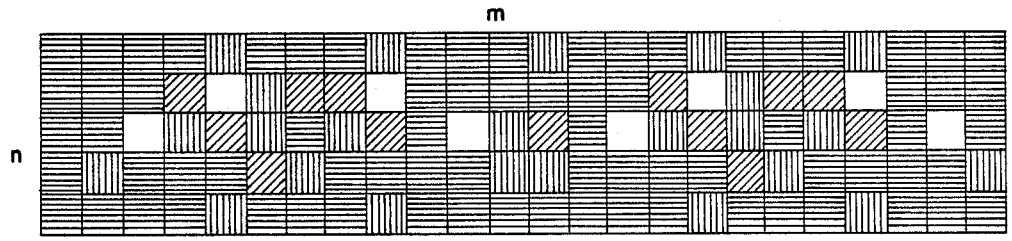
FIG. 3
MULTI-COLORED RASTER
CODED OBJECT
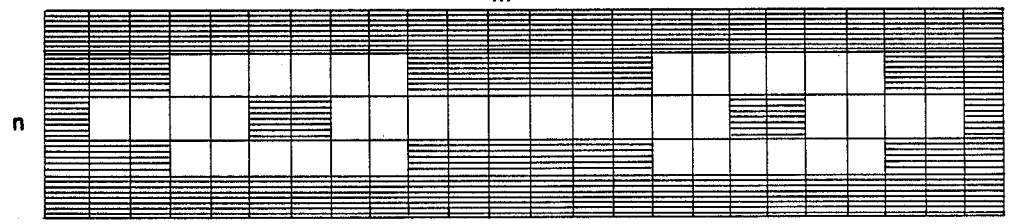
FIG. 4
BLACK/WHITE & PATTERN FORMS
COLOR-CODED OBJECT
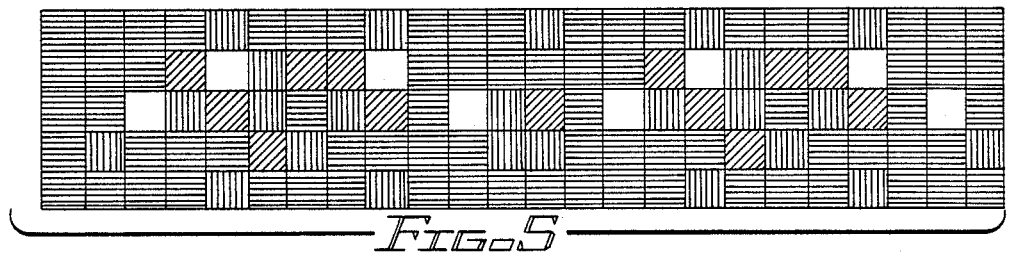
FIG. 5

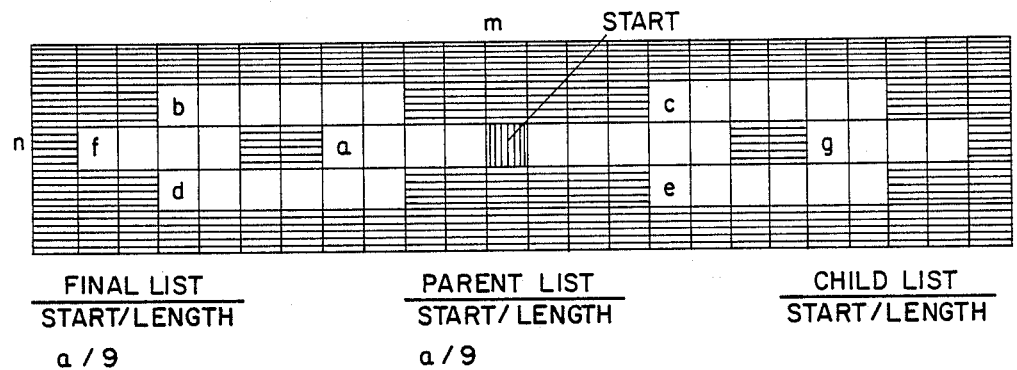
FIG. 6 — START OF UNIQUE RASTER RUNS
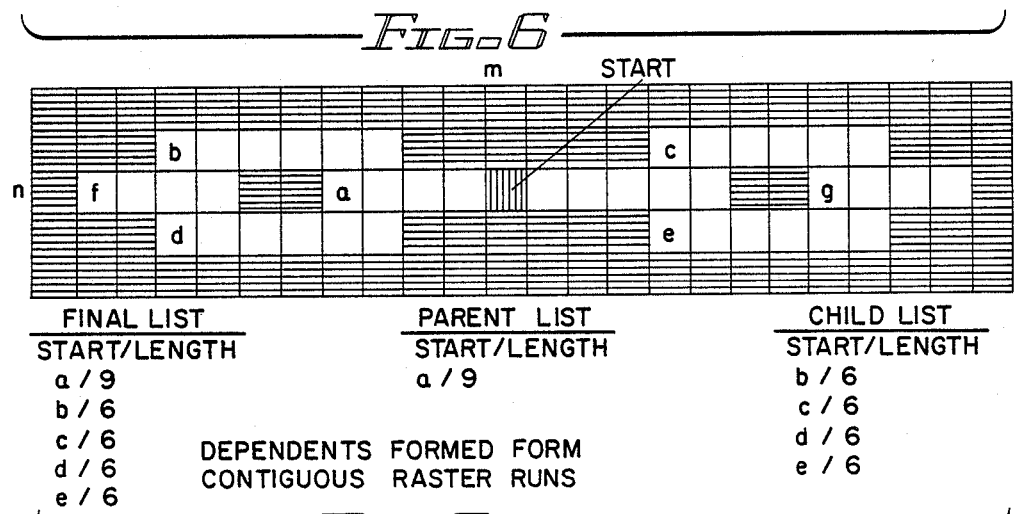
FIG. 7 — DEPENDENTS FORMED FORM CONTIGUOUS RASTER RUNS
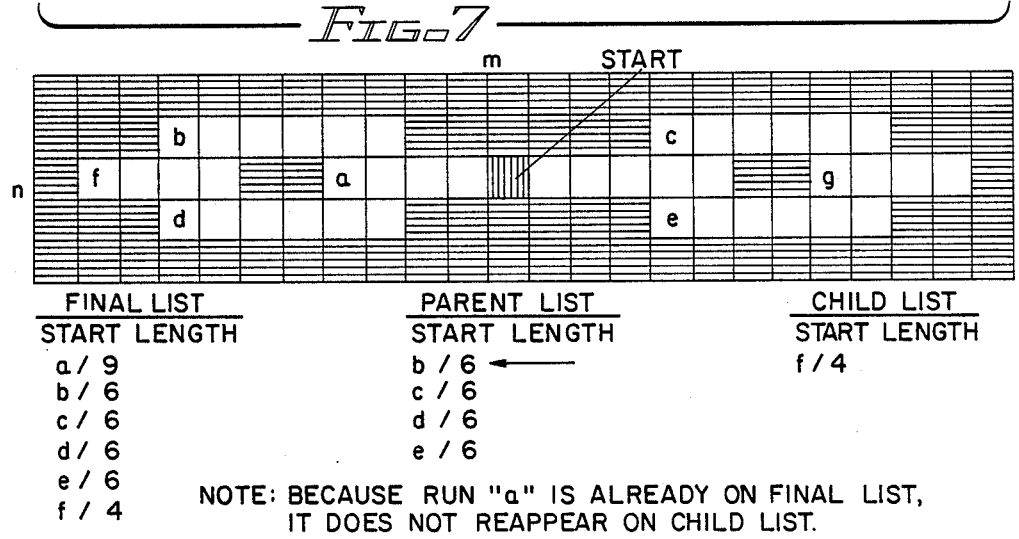
FIG. 8 — NOTE: BECAUSE RUN "a" IS ALREADY ON FINAL LIST, IT DOES NOT REAPPEAR ON CHILD LIST.

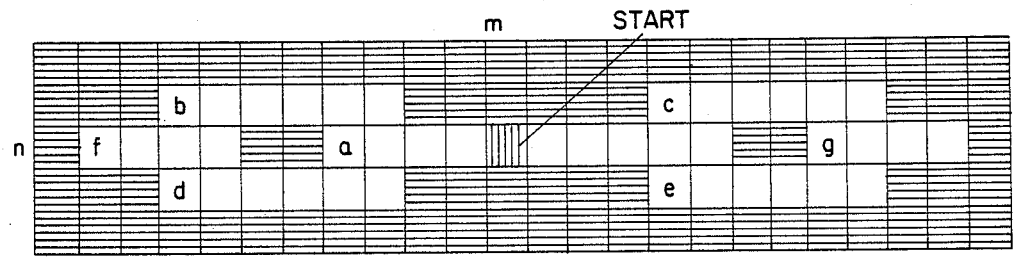

| FINAL LIST | PARENT LIST | CHILD LIST |
|---|---|---|
| START/LENGTH | START/LENGTH | START/LENGTH |
| a / 9 | b / 6 | f / 4 |
| b / 6 | c / 6 | g / 4 |
| c / 6 | d / 6 | |
| d / 6 | e / 6 ← | |
| e / 6 | | |
| f / 4 | | |
| g / 4 | | |

NO CHANGE OCCURS WITH RUN "c" AS PARENT BECAUSE RUNS "a" AND "g" ARE ALREADY ON FINAL LIST.

FIG. 11

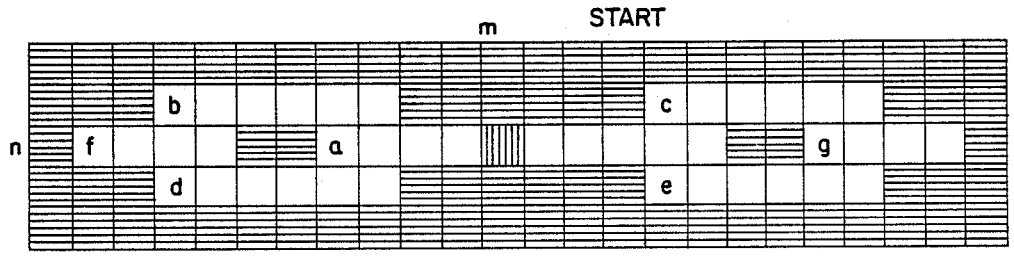

| FINAL LIST | PARENT LIST | CHILD LIST |
|---|---|---|
| START/LENGTH | START/LENGTH | START/LENGTH |
| a / 9 | f / 4 | |
| b / 6 | g / 4 | |
| c / 6 | | |
| d / 6 | | |
| e / 6 | | |
| f / 4 | | |
| g / 4 | | |

NO CHILDREN ARE PRODUCED BY RUNS "f" OR "g" SINCE RUNS "b","d","c" AND "e" ARE ALREADY ON FINAL LIST.

FIG. 12

FINAL LIST
START/LENGTH

PARENT LIST
START/LENGTH

CHILD LIST
START/LENGTH a / 9
b / 6
c / 6
d / 6
e / 6
f / 4
g / 4

RASTER RUN DETERMINATION PROCEDURE
TERMINATES UPON EXHAUSTION OF PARENT LIST

FINAL LIST NOW COMPLETELY DESCRIBES
OBJECT TO BE FILLED

| a | b | c | d | a | b | c | d |   COLOR-CODED PATTERN I

| a | b | c | d | a | b | c | d |   ROSTER DISPLAY

STEP 1: COMPARE ON BYTE BASIS. IF EQUAL, CONTINUE.
STEP 2: WHEN MATCH FAILS, COMPARE BYTES ON PEL LEVEL
TO DETERMINE EXTENT OF MATCH.

NOTE: PEL "b" IS END OF RUN

| a | b | c | d |
| a | b | c | d |
          EXTENT OF MATCH

FIG. 15

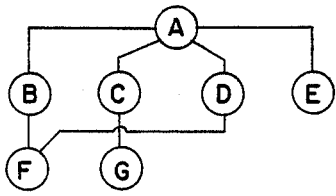

CONNECTED GRAPH
REPRESENTATION OF
RASTER RUNS IN FIGS. 6-13

FIG. 16

```
PROCEDURE dfs (v:vertex);
    VAR
        w:vertex;
    BEGIN
        mark(v) = visited;

FOR each vertex w on L(v) DO
            IF (mark(w) = unvisited)
                THEN dfs(w)
    END (* dfs *)
    DEPTH FIRST SEARCH
```

FIG. 17

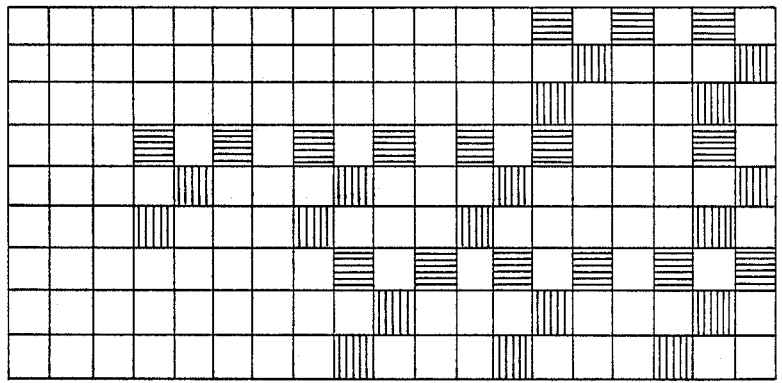

TYPICAL COLOR PATTERN
OVER WHICH PRIOR ART
RECURSIVE SINGLE COLOR
RASTER FILL ALGORITHMS
WOULD NOT TERMINATE

BLUE

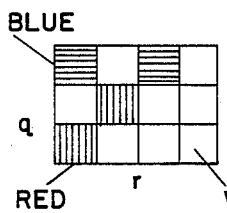

q × r REFERENCE PATTERN

RED   r   WHITE

FIG. 18

METHOD FOR ASCERTAINING AND FILLING OF BOUNDED AREAS OF A COLORED RASTER DISPLAY

TECHNICAL FIELD

This invention relates to a method for ascertaining the boundary of an arbitrarily-shaped closed polygon filled with a first color-coded pel pattern and for filling said ascertained polygon with a second color-coded pel pattern in an interactive raster display system.

BACKGROUND

Prior art interactive buffered raster displays include low-persistence phosphor multiple gun color cathode ray tubes (CRT's). Such a CRT is the electronic medium upon which an image is painted by way of electron beam deflection and intensity modulation of its multiple colored guns. Information, both defining the image to be painted and providing the necessary control, is obtained from a buffer intermediate the CRT display and a stored program-controlled processor. The processor executes lists of graphical orders ultimately resulting in the CRT painted image. In executing its tasks, the processor causes bit values in the form of a multibit code to be stored in a counterpart location in the buffer. The multibit code, termed a "pel", consists of an x,y position coordinate and a color number or value. As each pel is extracted from the display buffer during a horizontal scan of a raster-driven display, the bits are used to index a translate table which converts them into a larger number of bits. This larger number of bits, in turn, drives designated red, green, and blue digital-to-analog converters actually modulating the multi-gun CRT beam intensities.

Foley and Van Dam, "Fundamentals of Interactive Computer Graphics", Addison-Wesley Publishing Co., 1982, devote chapter 12 (pp. 479–503) to the rudiments of a raster display architecture. Also, at pp. 456–460, they describe the contemporary state of the art in the ascertaining of the boundary of arbitrarily-shaped closed polygons and the filling thereof for a bit-mapped presentation/display system such as an interactive stored processor control raster color-coded display. The preferred method described on pp. 457–458 for ascertaining the shape of the polygon to be filled involves finding the intersections of a scan line with all the edges of a polygon, sorting the intersections by an increasing x coordinate, and filling in all pels between pairs of intersections.

Agui et al, U.S. Pat. No. 4,334,274, "Method of Determining Whether or Not a Region in a Picture is Within a Closed Boundary, and an Apparatus Therefor", issued June 8, 1982, describe a method for resolving ambiguous pels or pixels bordering a black/white object by edge-detecting the object and overlaying said edge with logical positive and negative object images. This permits ascertaining ambiguous pels. Thereafter, there is involved the step of either shrinking or expanding the black or white fill in the region of any ambiguous pel in order to conform to the detected object edge.

Appel and Evangelisti, "Automatic Filling of Bounded Areas in a Raster Display", IBM Technical Disclosure Bulletin, Vol. 21, pp. 1300–1303, August 1978, show the scanning and filling of a raster object starting at an arbitrary point within the object domain and then determining pel color and filling on the fly. Appel's method of filling the pel (cell) positions constituting the polygon interior requires that a cell of arbitrary color, termed a "seed" cell, be placed within the polygon. If an empty cell is adjacent (contiguous) only to the seed cell, then said empty cell is filled. The "filled" cell in turn becomes a new "seed". If an empty cell is between a cell defining the polygon border and a "seed" cell, it is left empty. Admittedly, such a recursive procedure uses no boundary equations. However, the "identify and fill" cells on the fly appear valid only for runs of simple patterns such as black objects in white fields. Indeed, where a pattern is complex such as an rXq subarray of pels of multiple colors, then the recursion becomes effectively non-terminating because where the replacement color-coded pattern corresponds at any point to the original color-coded pattern, then Appel's system of marking previously visited locations has the effect of leaving those locations unmarked.

THE INVENTION

It is accordingly an object of this invention to devise a method wherein the bounded area of a closed polygon shape in a raster display is ascertained and filled. It is a related object that the raster polygon shape be ascertained and filled even though it exhibits a complex color pattern. It is still a further object that the method execution time be finite and that any area ambiguities be completely resolvable.

These objects are satisfied by a method for use in a bit-mapped presentation display system. The method ascertains the boundary of an arbitrarily-shaped closed polygon filled with a first color-coded pel pattern, the first pattern being embedded in a raster color-coded domain. The method further fills the ascertaining polygon with a second color-coded pattern.

The method steps comprise (a) identifying the first color-coded pattern; (b) determining all unique raster runs of said identified first pattern and creating a counterpart data representation thereof; and (c) filling in at least a portion of the raster color-coded domain with the second pattern controlled by the data representation.

The determination of unique raster runs involves the steps of (d) ascertaining connected (contiguous) regions within the domain exhibiting the first pattern and forming a location list thereof by traversing the domain as if it were a connected graph from an arbitrary point therein; and (e) at the point in the traverse where it is ascertained that a domain region is not connected, resolving the boundary by comparing elements of the first pattern in high resolution with elements in the domain local to the connected and unconnected regions and amending the location list accordingly.

The advance in this art involves the recognition that contiguous runs can be represented as a graph in which each unique raster run is a node. Thus, ascertaining the polygon area can be achieved by any traverse which encounters each node only once. The traverse may be non-recursive (parent-child) or recursive (depth first). Also, the advance involves the location listing of said ascertained connected regions, resolving boundary ambiguity by high-resolution element-by-element comparison of a referenced pattern with the domain local to the ambiguity, and then filling the region controlled by the location list.

BRIEF SUMMARY OF THE DRAWING

FIG. 3 is a typical rXq primitive pattern for a complex domain (color-coded) object.

FIGS. 4 and 5 respectively illustrate a multicolor-coded object in which the multicolored pattern has been married to the black/white coded topology.

FIGS. 6–13 illustrate the determination of the unique raster runs constituting the polygon area and the corresponding list making thereof utilizing a nonrecursive traverse (parent-child).

FIG. 15 shows edge resolution by way of row comparison match and pel comparison upon row mismatch.

FIG. 16 sets out the connected graph representation of raster runs in FIGS. 6–13.

FIG. 17 depicts the pseudocode for a recursive traverse of the depth first type.

FIG. 18 illustrates a typical color pattern over which prior art recursive single-color raster fill algorithms would not terminate.

DESCRIPTION OF THE PREFERRED EMBODIMENT AND INDUSTRIAL APPLICABILITY

Attributes of Interactive Raster Display Systems

Figure 1:
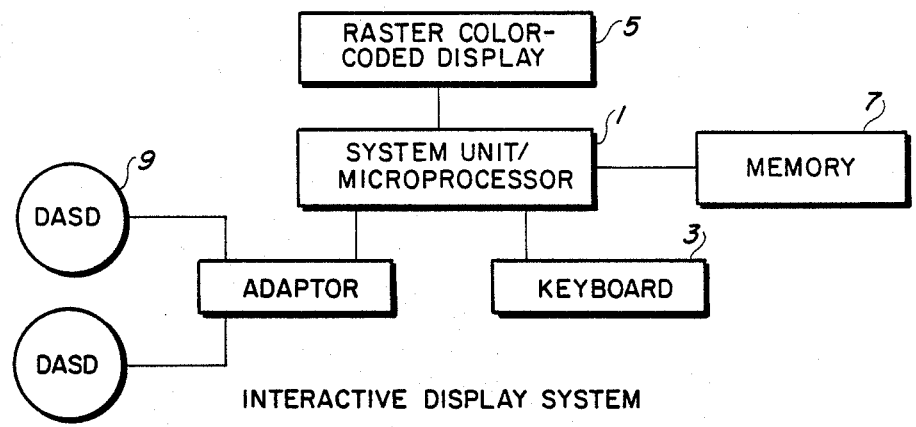
FIG. 1 discloses an interactive stored program-controlled display and memory with a refreshed raster display configuration.

Referring now to FIG. 1, there is shown an interactive raster display system of the prior art. Such a system typically includes a multigun color display monitor 5, a keyboard 3 with programmable function keys, a mix of RAM and ROM based memory 7, one or more DASD's 9 attachable through an adaptor, and a stored program-controlled microprocessor 1 interconnecting the monitor, keyboard, memory, and DASD. One configuration, among many commercially available ones upon which the method of this invention may be practiced, includes the IBM 5153 Color Monitor with an IBM 4910 Color Adaptor Card, an IBM 5160 Systems Unit, a PC keyboard, and any commercially available 5¼ inch floppy disk drive with a PC adaptor.

Referring again to FIG. 1, there is also shown some detail of the refreshed raster display portion of the system. This comprises a display buffer 13, a translate table 15, a processor 1, and a refresh controller 11. In this regard, the processor 1 constructs an image of pels and writes them into the display buffer 13 over paths 27 and 29. Furthermore, processor 1 also may access and alter the contents of translation table 15 over paths 23 and 25. Once the image is resident in buffer 13, it is normally cycled through the translate table 15 and the raster display controls (not shown) as regulated by the refresh controller 11 over path 33. The refresh controller actually accesses consecutive locations in buffer 13. The color values of the extracted pels are in turn converted by the translate table and applied to the red 17, green 19, and blue 21 guns of the CRT of the color monitor 5. The x,y coordinates associated with the extracted pel control the electron beam deflection of the CRT.

Since each display buffer 13 location defines one point-sized element of an image, a simple buffer having 1 bit per pel would suffice for a two-color (black/white) image. However, color images need a multibit code for definition. To extend the color and richness of pels and patterns without burdening the buffer, the code points are used as pointers in a larger code space. These are among the functions admirably performed by structured sets of color translate tables. This is taught in Langdon et al, U.S. Pat. No. 4,255,861, issued Sept. 30, 1980. That is, a translate table serves to minimize display refresh buffer size while maximizing the number of distinctly displayable colors.

Raster Representation of Closed Polygons

Figure 2:
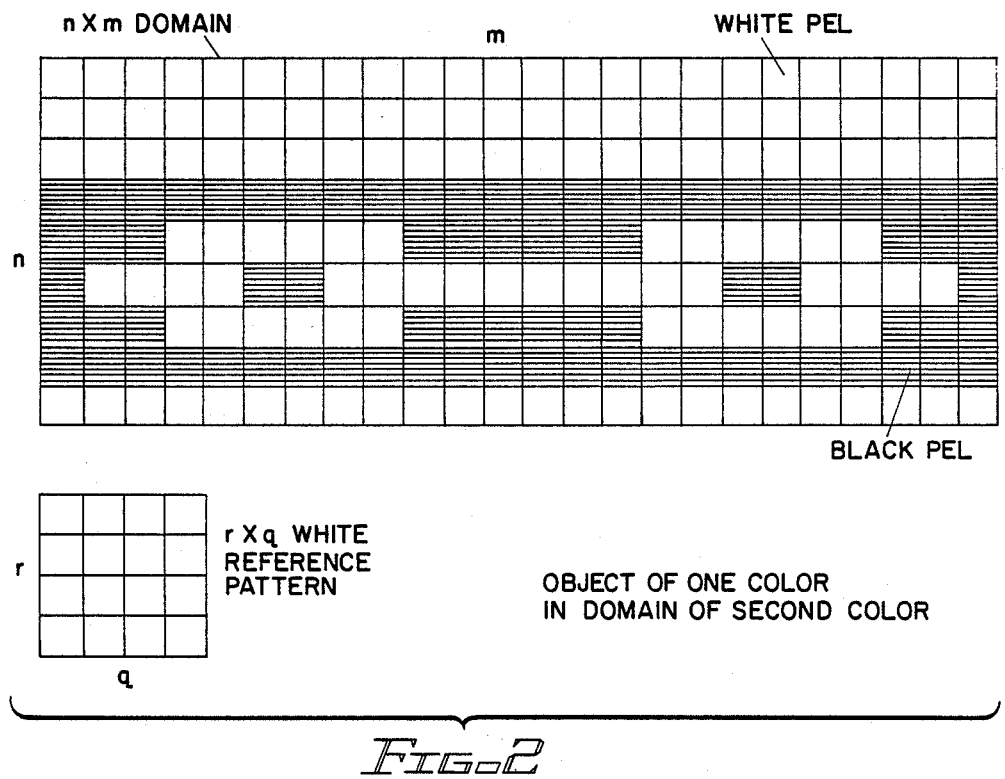
FIG. 2 sets out a black and white coded object suitable for exhibition on a monochrome display monitor.

Referring now to FIG. 2, there is shown a black and white raster-coded object. That is, FIG. 2 represents a bit map such as might appear in the refresh buffer or on the display face. The entire m×n array of pels is termed a "domain". If an "object" is defined as the replication of a reference pattern in the domain, then several objects are included in the domain of FIG. 2. Clearly, these comprise a white chain-linked object in a black field for a q×r white pel reference pattern and a black band having a chain link apperture set in a white field for a black pel reference pattern. In either case, the object is closed or bounded and consists of runs of contiguous pels of like color in the raster scan line direction.

Another way of viewing a run is with reference to comparing a given row of a reference pattern with the row (raster scan line) of the domain being compared. Thus, in FIG. 2 for a given $r \leq n$ and $q \leq m$, $r \times q$ white reference pattern, the first row consists of four white pels. If comparison were made four pels at a time, then a raster run would consist of as many repetitions of four white pels in a row in the raster scan line direction. The reference pattern also indicates that the next row beneath the first row should consist of a row of four white pels. Thus, the white pels encountered in the second row of the object would be considered contiguous, whereas the black pels in the row immediately above the first row of the object in FIG. 2 having a different color indicate a border or boundary.

Referring now to FIG. 3, there is shown a typical primitive r×q subarray of contiguous pels, each pel of which may assume one of three, four, or more color values. In this regard, the difficulty of ascertaining the "boundary" of an object formed from multiple contiguous arrays of color complexity is greater than that of patterns of solid color, i.e. FIG. 2. This is illustrated in FIGS. 4 and 5 where the chain-linked object is somewhat masked by being embedded or formed from the color rich patterns.

The Concept of Run and Its Graph Representation

A run is operationally defined as the color value match of q consecutive pels on the ith row of a first or reference pattern with q consecutive pels on the jth row or raster scan line of a domain. With reference to FIG. 2, each row of the reference pattern consists of pels of like color value so that for a given raster scan line of the domain, a run would exhibit contiguous pels of the same color value. However, where a reference pattern has pels of several color values, then a run would require the replication on a pel comparison match basis. In this regard, reference should be made to FIG. 18 where the reference pattern consists of a q×r array of a pattern of red, white, and blue pels. The top row of the reference pattern is coded as blue-white blue-white and "runs" in the domain can be found in the first, fourth, and seventh domain rows from the top. Likewise, the second reference pattern row is coded as white-red white-white. This appears without ambiguity on the second, fifth, and eighth rows of the domain. As is visible in high contrast in FIGS. 2 and 6-13, a raster scan line may have one or more runs. In FIG. 6, the leftmost pel position of a run is labeled for illustration by letters. In the preferred embodiment, the location of a run is defined by the position of the leftmost pel position.

The first method step contemplates identifying the pattern constituting the object. In the simplified illustration used with FIGS. 6-13, the pattern is a q×r white pel array. It should be recalled that Appel et al recursively colored neighboring cells starting with the color value of a single seed cell. This recursive coloring continued until a border cell of an object was detected. While attractively simple, Appel could not use replacement color-coded patterns more complex than a single pel for his algorithm since be could not guarantee a termination of his identify and filling of cells on the fly where the replacement color-coded pattern corresponded at any point to the original color-coded pattern. This is because Appel's system of marking previously visited locations by replacing them with new values has the effect of leaving them unmarked. Reference should be made to FIG. 18. In this domain, white cells are liberally interlaced with red and blue cells. Since Appel is monochromatic, he would either white out, red out, or blue out the domain depending upon whether his seed cell was red, white, or blue. If he tried to use a more complex replacement color-coded pattern, such as a different pattern of red, white, or blue pels, it would be non-terminating. For example, if Appel's process started on a blue cell and that cell was replaced with another blue cell from a complex replacement color-coded pattern, and the same happened in an adjacent cell, then after "filling on the fly" two adjacent cells, they would be effectively unchanged, and Appel's algorithm would cycle indefinitely between them.

Referring now to FIG. 16, there is shown a connected graph representation of raster runs of the white object depicted in FIGS. 6-13. Each run is represented by a counterpart labeled vertex. Line-to-line contiguity between runs is shown by an edge connecting a pair of vertices. This means that the determination of the area of a closed polygon by scanning contiguous runs is the same as dealing with the graph and visiting the vertices and connecting edges in a systematic fashion.

The determination of the polygon area formed by unique contiguous raster runs is equivalent to presenting such runs as a graph and then traversing the graph such that each node is visited only once. In this specification, both a recursive (depth first) and nonrecursive (parent-child) traverse are discussed.

The Recursive Traverse

In this regard, a depth first search, which is a generalization of the preorder traversal of a tree, is one important technique. A depth first search works by selecting one vertex v as a start vertex and marking v as visited. Then each unvisited vertex adjacent to v is searched in turn, using depth first search recursively. Once all vertices that can be reached from v have been visited, the search of v is complete. If some vertices remain unvisited, an unvisited vertex is selected as a new start vertex. This process is repeated until all the vertices have been visited. The name "depth first search" is apt because the technique continues searching in the forward (deeper) direction as long as possible. For example, if x is the most recently visited vertex, then a depth first search selects some unexplored edge connecting x to y. If y has been visited, the procedure looks for another unexplored edge connected to x. If y has not been visited, then the procedure marks y as visited and initiates a new search at y. After completing the search through all paths beginning at y, the search returns to x, the vertex from which y was first visited. The process of selecting unexplored edges emanating from x is then continued until all edges from x have been explored.

Illustrative of a pseudocode representation of a depth first search is shown in FIG. 17. An adjacency list can be used to represent the vertices adjacent to vertex x, and a data structure such as an array mark, whose elements are chosen from (visited, unvisited), can be used to determine whether a vertex has been previously visited.

Assume that the procedure dfs(v) of FIG. 17 is applied to the graph of FIG. 16 with the equal sign A. The procedure marks A visited and selects vertex B from the adjacency list of vertex A. Since B is unvisited, the search continues by calling dfs(B). The algorithm now marks B visited and selects the first vertex from the adjacency list for vertex B. Thus, dfs(F) is in turn invoked. The algorithm now marks F. D is in turn marked and since A has already been marked, a pattern is invoked using dfs(C), dfs(G), dfs(E), or dfs(E), dfs(G), dfs(C). At this point, the original call of dfs is complete and all the vertices have been marked.

Among the properties of the depth first search is a traversal of all connected vertices in a graph and marking a memory or list to indicate those vertices visited.

The Non-recursive Traverse

Another way of visiting all the nodes of a graph exactly once is to identify all of the nodes contiguous to a given node on an "echelon basis". A more colorful terminology would recognize that any given node or vertex may be labeled a "parent" and those adjacent to it termed its "children" or "descendents". The following illustrative example exemplifies the non-recursive (parent-child) traverse and is an alternative to the recursive traverse. The factors dictating utilization of one or the other are those ordinarily appreciated by those skilled in the art and include the amount of available internal memory. It is, for example, well known that recursive procedures may require an order of magnitude or more than non-recursive procedures.

Illustrative Example

Figure 14:
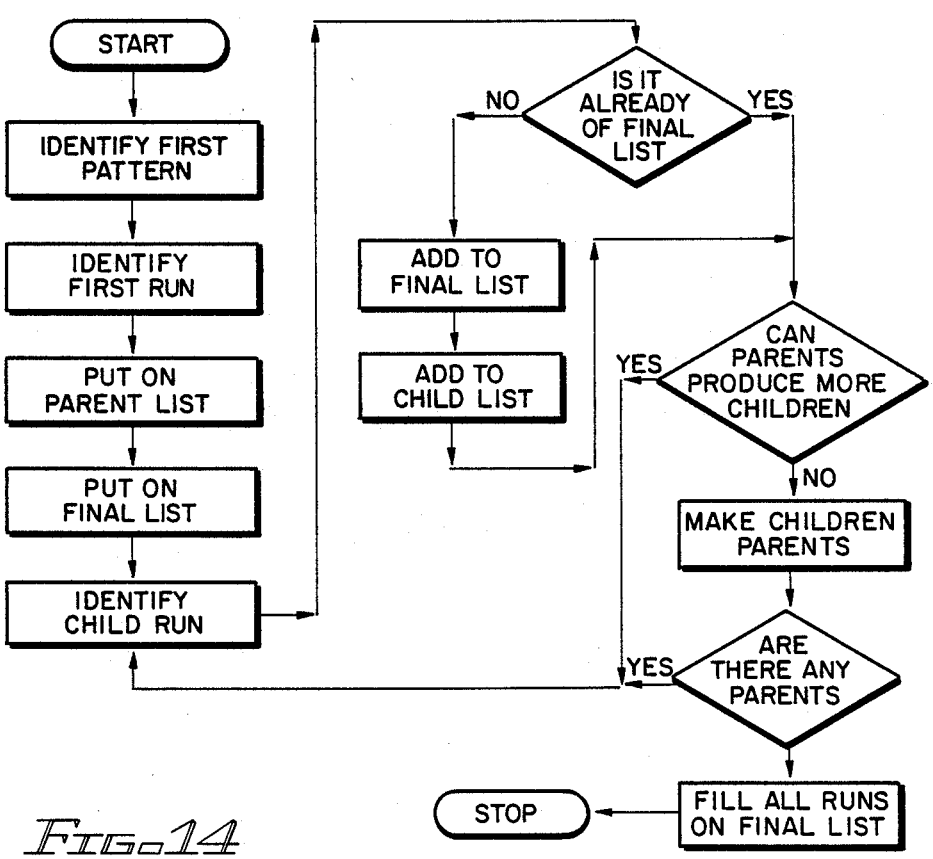
FIG. 14 sets out the raster run control flow of the run and list-making steps of FIGS. 6–13.

Referring now to FIGS. 6 and 14, the method of the invention utilizes three lists: a permanent final list and a temporary parent and child list. Assuming that the first pattern is identified, and starting at an arbitrary point within an object, a graph traversing search or scan is invoked. In this regard, a conventional left scan is made until the lefthand end of a run is identified and labeled, in this case A. After identifying the coordinates of the left end of a run, a scan is made to determine the length moving from left to right. In this case, run A is nine pels long. It is then placed on the "parent list" and on the "final list".

It is next desirable to identify the contiguous runs or, in the argot of FIG. 14, identifying the "dependents" or "children". Referring now to FIG. 7, the "children of run A are the contiguous runs B, C, D, and E. Since the dependents are not on the "final list", they are therefore added both to the "final list" and the "child list".

Referring now to FIG. 8, the entries on the "child list" are moved over to the "parent list". Starting with run B, runs A and F are contiguous thereto. However, because run A is already on the "final list", it does not appear on the "child list". Consequently, only run F appears on the "child list". At this point, runs B, C, D, E, and F are added to the "final list".

Figure 9:
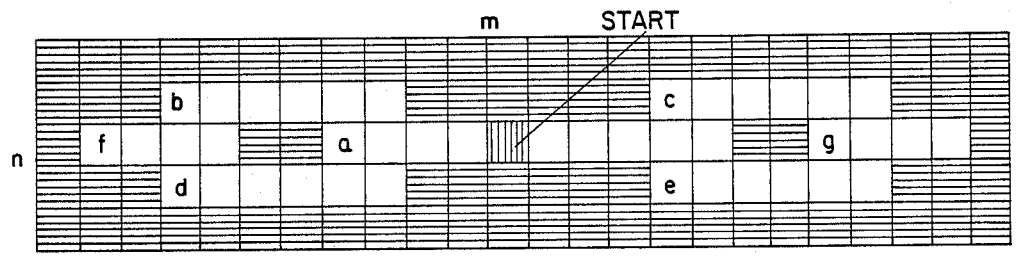

Referring now to FIG. 9, the dependent (contiguous) runs associated with run C are processed. These are runs A and G. Since A is already on the "final list", it does not reappear on the "child list". Thus, only run G appears on the "child list". Note that B, C, D, E, F, and G are on the "final list".

Figure 10:
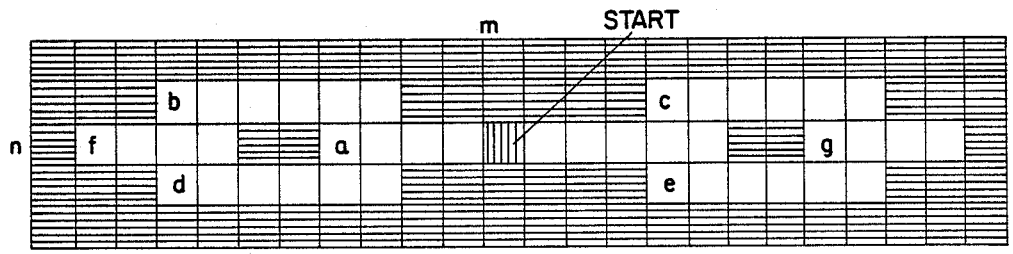

Referring now to FIG. 10, runs F and A are the contiguous descendents of run D. Because they are already on the "final list", there is no change. The same is true with run E as a parent because A and G are also already on the "final list" shown in FIG. 11. At this point, the "child list" runs of F and G are transferred to the "parent list". There are no dependent runs since B, C, D, and E are already on the "final list".

Figure 13:
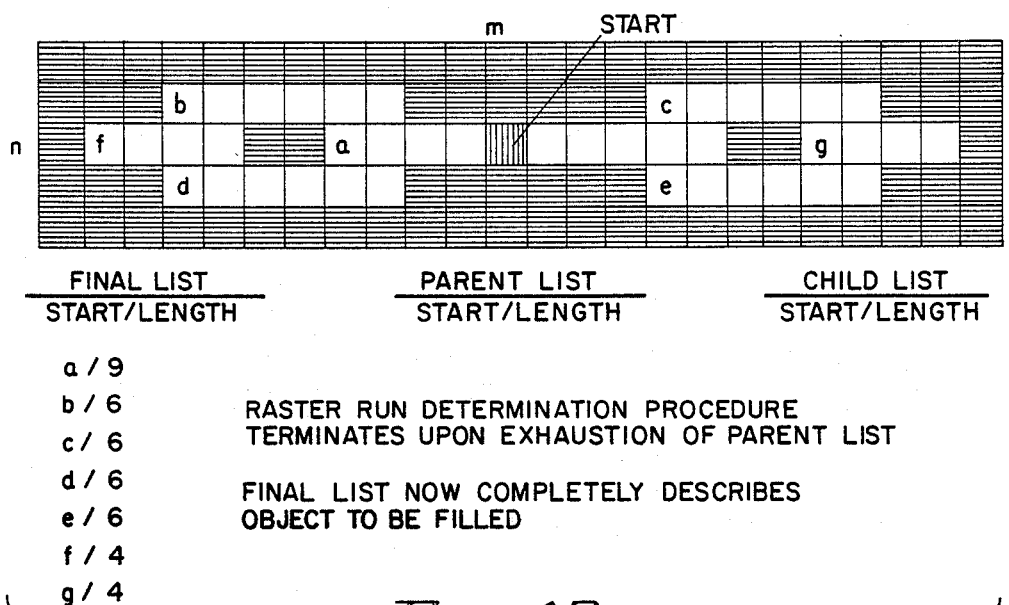

As set out in FIG. 13, the final list now completely describes the object to be filled. The procedure terminates upon exhaustion of the "parent list".

Implementation

In the following discussion, there will be first set out the 15 steps of an implementation of the method of this invention, together with a detailed description thereof.

The steps are:
1. Initialization.
2. Travel leftward on a byte-match basis to determine run's start.
3. Travel leftward on a pel-match basis to determine run's start and see if run is already on a list.
4. Travel rightward on a byte-match basis to determine run's end.
5. Travel rightward on a pel-match basis to determine run's end.
6. Put run data on list 1 and list 2.
7. Dependent runs are now the ancestors.
8. Look up one raster line for descendent contiguous runs unless already at the top of screen.
9. Check for new runs.
10. Look for new descendent runs from the end of the current run.
11. No match, so travel right one pel.
12. Look down one raster line for new dependent runs unless already at the bottom of the screen.
13. Get the next antecedent (parent) run.
14. All of the descendents have been found.
15. All runs are written to the screen.

Detailed Description of Implementation

In step 1, two run counters are created. These are the current and previous run counters and are both set to zero. Next, the workspace buffer is divided into two equal parts where list 1 stores the screen starting byte offsets (1 word), and list 2 stores the run's byte length, the end pel offset and the start pel offset. After this, list 1 and list 2 pointers are set to the top of lists 1 and 2 respectively. The list 2 pointer for a run is equal to the list 1 pointer for the run plus half the workspace buffer length.

In step 2, the starting byte offset is set to the beginning column offset, and the length and the start pel offsets are set to zero. The cursor travels left from the beginning column offset to find the run's starting location. First, it must be ascertained whether the pattern matches to the byte boundary. If so, set the byte-match flag high.

At this point, it is necessary to begin to match the background pattern with the Regen buffer (the screen) on a byte level. Each time an entire byte matches, it is necessary to decrement the start byte offset and increment the byte length. This continues until a match fails or until the left edge of the screen is reached. This location is the starting byte offset unless modified in the ensuing step.

In step 3, since a byte match has failed, it is necessary to find the pel offset and the byte offset to the start of the run. If the byte-match flag from step 2 is greater than zero, then it is necessary to ascertain whether 3, 2, or lastly, 1 of the Regen pels matches the background pattern looking left from the start byte offset. The start pel offset is found to be 1 if the closest 3 pels match, 2 if the closest 2 pels match, and 3 if the closest pel matches from the start byte offset. If a non-zero pel offset is found, then the start byte is decremented and the byte length incremented.

If the byte-match flag from step 2 is equal to zero, a different procedure is followed. In this case, it is first necessary to ascertain whether the two closest pels match the background pattern looking left from the start byte offset. If the two closest pels do not match the background, then it is necessary to determine whether the closest pel matches. If no match is found, then the start pel position is the remainder when the beginning column offset is divided by 4. If a match is found, then the starting pel position is decremented by the number of pels that matched.

With this starting location, i.e. both byte and pel offsets, it is necessary to check list 1 first for a match, and then list 2's starting pel offset for confirmation. If the current run is already on list 1 and list 2, then go to step 10.

In step 4, travel rightward on a byte-match basis to determine the run's end requires that the end pel offset be set to 3 and the byte-match flag set to low. From the beginning column offset, travel towards the right. Determine whether the pattern matches to the byte boundary. If so, it is necessary to set the byte-match flag high and then begin to match the background pattern with the Regen buffer on a byte level and each time an entire byte matches, then increment the byte length. This continues until a match fails or the right edge of the screen is reached. At this point, the run length has been found unless modified by step 5.

In step 5, travel is rightward on a pel-match basis to determine the run's end. Since the byte-match failed, it is necessary to find the pel's end offset and the run byte's length. If the byte-match flag from step 4 is greater than zero, then see if 3, 2, or lastly, 1 Regen pel matches the background pattern looking left beginning at the position equal to the start byte plus the run byte's length plus 1. If a match is found, then it is necessary to increment the byte length. The end pel offset is found to be 2 if 3 pels match, 1 if 2 pels match, and zero if 1 pel matches.

If the byte-match flag from step 4 is equal to zero, a different procedure is followed. At this point, it is necessary to determine whether the 2 closest pels match the background pattern looking right from the beginning column offset divided by 4. If they do not match, then it is necessary to check if the cloest pel matches. The end pel offset is equal to the beginning pel offset from step 3 plus the number of pels that matched.

In step 6, it is necessary to put run data on list 1 and list 2. If the run's length in pels makes for a valid run, then the starting byte offset is placed onto list 1 and the run's byte length, and the ending and starting pel offsets onto list 2. At this point, the current run count number is incremented. Also, the current list 1 and list 2 pointers are incremented so that they point to the first empty space in their buffers. In the event that there is no more room in the buffer, then an error flag is set and a transfer made to step 15. If the previous count number is not zero, then a transfer is made to step 10.

For scanning purposes in step 7, the dependent runs are now the ancestor (parent) runs. In this regard, the descendent run list becomes the ancestor run list by setting the ancestor run list (parent) pointers into list 1 and list 2 to the start of the dependent runs in list 1 and list 2. This is accomplished by backing up the pointers from the first empty space on list 1 and list 2 by the number of dependent (children) runs. The pointers for the next generation of dependent runs continues to point to the first empty space on list 1 and list 2. Relatedly, the dependent run count number becomes the parent count number and the dependent count number is reset to zero.

In step 8, it is necessary to scan or look up one raster line for new children (dependent runs) unless the dependent scan line is already at the top of the screen. This is implemented by obtaining the starting byte, starting and ending pel, and byte length of an ancestor and determining the new starting byte if the parent were one line up. Also, the run's beginning and ending column numbers are ascertained as well as the beginning and ending byte of the entire line in the Regen buffer for one line up.

In step 9, new runs are checked. This means that if the screen pel matches the background pattern, this is treated as a new beginning point and a return is made to step 2. Otherwise, a transfer is made to step 11.

At step 10, a scan is made for new dependent runs from the end of the current dependent run. Thus, a skip is made to the end of the currently identified valid dependent (child) run, two columns are added, an update of the next dependent run's trial starting byte is performed. With respect to the latter, a check is also made to see whether this is greater than the ending column of the parent run. If so, then a transfer is made to step 12. Otherwise, a start is made from this new starting column and a transfer to step 9 performed.

In step 11, in the event of no match, travel is made right to one pel. Since the Regen buffer pattern does not match the background pattern, travel right one pel, and an update is made of the next dependent run's trial starting byte. After this, a transfer is made to step 9 unless past the end of the ancestor (parent) run. In this latter event, a transfer is made to step 12.

In step 12, a scan down of one line for new dependent runs is made unless already at the bottom of the screen. A transfer is made to step 13 if step 12 has already once been performed. From the parent starting byte, it is necessary to determine the new starting byte if that parent were one line down. Also, the run's beginning and ending column number, and the beginning and ending byte of the entire line in the Regen buffer for one line down must be recovered.

In step 13, the next ancestor (parent) run is obtained. This signifies that all the dependent (children) runs of the parent run have been identified and placed on the dependent (children) run list. The parent run is no longer needed so that the previous run count is decremented by 1 and the parent run pointer points to the next parent run in list 1 and list 2. After this, a transfer is made to step 8 until the previous run count is decremented to zero.

In step 14, all of the dependent runs have been found. Thus, all of the dependents of all of the parents have been found and put on the run list. A transfer is made to step 7 until the current run list contains zero runs.

In step 15, all runs are written to the screen. This means that all runs have been identified. Thus, beginning at the top of list 1, all of the runs can be filled with the fill pattern. The fill pattern is justified to the top lefthand corner of the screen and repeated as many times as necessary in order to fill the interior region of the ascertained shape.

The following table sets out an assembly level code sequence instructing the processor portion of an interactive raster display system in the execution of the method steps of this invention. The syntax for assembly code is from left to right:

| label | op code argument | comment field |
| --- | --- | --- |

Note, that each comment is prefixed by a semicolon (;). Also, the abbreviations "dw", "db", and "?" respectively designate define word, define byte, and reserve or allocate space.

The invention has been described at the functional, algorithmic, and assembler language levels for use in any interactive stored program-controlled raster display system. It will be apparent to those skilled in the art that various modifications and variations may be made in the method of this invention without departing from the true spirit and scope thereof.

TABLE 1

Assembly-level Sequence for Ascertaining and Filling of Bounded Areas of a Colored Raster Display
© Copyright 1984 IBM Corporation

| LASTLINE | equ | 199 | ;Last line number |
| --- | --- | --- | --- |
| FILLDATA | segment para memory 'CODE' | | |
| DCBT | struc | | |
| SORSEG | dw | ? | ;Byte segment |
| SOROFF | dw | ? | ; offset |
| SORBAS | dw | ? | ; partial area offset |
| SORBSL | dw | ? | ; bytes per line |
| SORFRM | dw | ? | ; offset between frames |
| DESSEG | dw | ? | ;Destination segment |
| DESOFF | dw | ? | ; offset |
| DESBAS | dw | ? | ; partial area offset |
| DESBSL | dw | ? | ; bytes per line |
| DESFRM | dw | ? | ; offset between frames |

TABLE 1-continued

Assembly-level Sequence for Ascertaining and Filling
of Bounded Areas of a Colored Raster Display
© Copyright 1984 IBM Corporation

| | | | |
|---|---|---|---|
| AREBYT | dw | ? | ;Partial area bytes per line |
| ARELIN | dw | ? | ;           number of lines |
| DCBT | ends | | |
| RCBT | struc | | |
| ERROR | dw | ? | ;Error code (0 = no error) |
| OLDPAT | dw | 2 dup (?) | ;Old 4 × 4 pel pattern to match |
| NEWPATSG | dw | ? | ;New pel pattern segment |
| NEWPATOF | dw | ? | ;New pel pattern offset |
| RUNSEG | dw | ? | ;Run list segment |
| RUNOFF | dw | ? | ;Run list offset |
| RUNLEN | dw | ? | ;Run list length in bytes |
| STRTCOL | dw | ? | ;Beginning column for fill |
| STRTLINE | dw | ? | ;Beginning line for fill |
| VALIDRUN | dw | ? | ;Number of pels for valid run |
| NEWPATYP | dw | ? | ;If equals zero, 4 × 4 new pattern |
| COMPOSIT | dw | ? | ;Set if in composite mode |
| RCBT | ends | | |
| RCB | RCBT <> | | ;Run Control Block |
| DCB | DCBT <> | | ;Dissolve Control Block |
| PELPAT | db | 4 dup (?) | ;Old 4 × 4 pel pattern to match |
| NEWPAT | db | 4 dup (?) | ;New 4 × 4 pel pattern to put on screen |
| RUNCNT | dw | ? | ;current run count |
| RUNCNTP | dw | ? | ;parent run count |
| LIST1PTR | dw | ? | ;LIST1 pointer for current runs |
| LISTPTRP | dw | ? | ;LIST1 pointer for parent runs |
| MAXSIZE | dw | ? | ;maximum list size |
| STRTBYTE | dw | ? | ;run's start byte offset |
| BEGNBYTE | dw | ? | ;beginning byte offset |
| BEGINPEL | db | ? | ;beginning pel offset |
| LENBYTE | db | ? | ;run's length in bytes |
| STARTPEL | db | ? | ;run's starting pel offset |
| ENDPEL | db | ? | ;run's ending pel offset |
| MATCH | db | ? | ;flag for byte match condition |
| LIST1LEN | dw | ? | ;byte offset to LIST2 from start LIST1 |
| STRTLST1 | dw | ? | ;start of LIST1 |
| BEGNLINE | dw | ? | ;byte offset to start of Regen line |
| ENDLINE | dw | ? | ;byte offset to end of Regen line |
| FRAME | dw | ? | ;Indicates which frame is referenced |
| FRAMESAV | dw | ? | ;Saves frame |
| RIGHTLEN | db | ? | ;Byte length increase traveling right |
| BEGINCOL | dw | ? | ;Beginning col to search for new run |
| BEGCOLSV | dw | ? | ;saved value of BEGINCOL |
| PARNTEND | dw | ? | ;End of parent run |
| LINE199 | dw | ? | ;byte offset to last line |
| STBYTSAV | dw | ? | ;saved start byte offset for parent |
| ATTOP | db | ? | ;parent run at top of screen |
| DOWN | db | ? | ;flag hi if down run already checked |
| ANOTHER | db | ? | ;flag hi if more than one run in line |
| INTABLE | db | ? | ;run already in table |
| XPELS | dw | ? | ;number of pels in new pattern line |
| XTRA | db | ? | ;# of pels in last byte of line data |
| YLINES | dw | ? | ;number of lines in new pattern |
| XBYTES | dw | ? | ;number of bytes in new pattern |
| SHIFT | db | ? | ;shift count for new pattern data |
| FINAL | db | ? | ;if set DATASIZE called for last time |
| INIT | db | ? | ;if set BOUNDARY pattern word found |
| BOUNDARY | dw | ? | ;boundary pattern word |
| SAVEXTRA | db | ? | ;saved value of XTRA |
| MAKEPAT | db | 4 dup (?) | ;n × m pattern data when xdim = 3 pel |
| FILLDATA | ends | | |
| XCODE | segment para memory 'CODE' | | |
| | assume cs:XCODE, ds:FILLDATA | | |

PROCEDURES

| | | | |
|---|---|---|---|
| RPARMS | proc | near | ;Get parameters from calling program |
| | push | ds | |
| | mov | ax,FILLDATA | |
| | mov | ds,ax | ;Initialize to FILL data seg |
| | mov | es,ax | |
| | cld | | ;Auto-increment for string operations |
| | mov | di, offset RCB | ;Destination offset for move |
| | mov | cx, size RCB | ;Size of Run Control Block |
| | pop | ds | ;Restore ds to calling program |
| | mov | bx,[bp+6] | ;Parm 1 = Run Control Block |
| | mov | si,bx | ;Source offset for move |
| | repz | movsb | ;Move contents of RCB |
| | push | ds | ;Set ds to current program |
| | mov | ax,es | |
| | mov | ds,ax | |
| | mov | di, offset DCB | ;Destination offset for move |

TABLE 1-continued
Assembly-level Sequence for Ascertaining and Filling of Bounded Areas of a Colored Raster Display
© Copyright 1984 IBM Corporation

|  |  |  |  |
|---|---|---|---|
|  | mov | cx, size DCB |  |
|  | pop | ds | ;Restore ds to calling program |
|  | mov | bx,[bp+8] | ;Parm 2 = Dissolve Control Block |
|  | mov | si,bx | ;Source offset for move |
|  | repz | movsb | ;Move contents of DCB |
|  | mov | ax,es |  |
|  | mov | ds,ax | ;Reference ds to FILL data seg |
|  | ret |  |  |
| RPARMS | endp |  |  |
| FRMCHNG | proc | near | ;Alternate between frame1 and frame2 |
|  | cmp | DCB.DESFRM,0 | ;If frame offset = 0, no interlace |
|  | jz | FRAMEND |  |
|  | cmp | FRAME,1 | ;Are we in frame 1 or 2? |
|  | jz | INFRAME1 |  |
| INFRAME2: |  |  |  |
|  | sub | di,DCB.DESFRM | ;Subtract frame offset |
|  | mov | FRAME,1 | ;Reset frame indicator |
|  | jmp | FRAMEND |  |
| INFRAME1: |  |  |  |
|  | add | di,DCB.DESFRM | ;Add frame offset to move from 1 to 2 |
|  | sub | di,DCB.DESBSL | ;and subtract bytes per line |
|  | mov | FRAME,2 | ;Reset frame indicator |
| FRAMEND: |  |  |  |
|  | ret |  |  |
| FRMCHNG | endp |  |  |
| LINE2OFF | proc | near | ;convert line number to byte offset |
|  |  |  | ;input is line number in dx |
|  | mov | ax,DCB.DESBSL | ;put dest. bytes per line in al |
|  | mul | dl | ;multiply by current line |
|  | mov | cx,DCB.DESFRM | ;get frame offset |
|  | and | cx,cx | ;see if it is zero |
|  | jz | L1 | ;if is, ax is the byte offset, |
|  | shr | ax,1 | ;divide result by two |
|  | test | dl,1 | ;see if line is odd |
|  | jz | L1 | ;if not, continue |
|  | add | ax,cx | ;otherwise add dest. frame to total |
|  | mov | cx,DCB.DESBSL | ;subtract |
|  | shr | cx,1 | ;half a line |
|  | sub | ax,cx | ;from total |
| L1: |  |  |  |
|  | ret |  | ;result returned in ax |
| LINE2OFF | endp |  |  |
| OFF2LINE | proc | near | ;convert byte offset to line number |
|  | push | bx |  |
|  | push | cx |  |
|  | xor | dx,dx | ;zero dx |
|  | mov | ax,STRTBYTE | ;ax = run's starting byte |
|  | mov | cx,DCB.DESBSL | ;cx = destination bytes/line |
|  | mov | bx,DCB.DESFRM | ;get frame offset |
|  | and | bx,bx | ;see if it is zero |
|  | jz | 01 | ;yes? |
|  | cmp | ax,DCB.DESFRM | ;no, see if line even or odd |
|  | jl | 02 | ;even? |
|  | sub | ax,DCB.DESFRM | ;odd, so subtract frame offset |
|  | div | cx | ;and divide |
|  | shl | ax,1 | ;then, double results and |
|  | inc | ax | ;add one |
|  | jmp | 03 | ;and ax = line number |
| 01: |  |  | ;zero frame offset |
|  | div | cx | ;so divide by destination bytes/line |
|  | jmp | 03 | ;and finished |
| 02: |  |  | ;even frame offset |
|  | div | cx | ;so divide by destination bytes/line |
|  | shl | ax,1 | ;double result and finished |
| 03: |  |  |  |
|  | pop | cx |  |
|  | pop | bx |  |
|  | ret |  | ;ax = line #,dx = byte offset in line |
| OFF2LINE | endp |  |  |
| READLIST | proc | near | ;GET RUN ENTRIES FROM LIST |
|  |  |  | ;input is run pointer in ax |
|  | push | es | ;save Regen buffer segment |
|  | push | di | ;and offset to last color byte |
|  | mov | es,RCB.RUNSEG | ;point es to Run buffer segment |
|  | mov | di,ax | ;offet to start of the parent run |
|  | mov | ax,es:[di] | ;get starting byte |
|  | mov | STRTBYTE,ax |  |
|  | mov | STBYTSAV,ax | ;and save it |
|  | add | di,LIST1LEN | ;get offset into LIST2 |

TABLE 1-continued
Assembly-level Sequence for Ascertaining and Filling of Bounded Areas of a Colored Raster Display
© Copyright 1984 IBM Corporation

|  |  |  |  |
|---|---|---|---|
|  | mov | dx,es:[di] | ;get data |
|  | mov | ax,dx | ;store in ax |
|  | mov | LENBYTE,ah | ;get run's byte length |
|  | and | al,0fh |  |
|  | mov | STARTPEL,al | ;starting pel offset for run in LIST1 |
|  | mov | ax,dx | ;recover LIST2 data |
|  | and | al,0f0h | ;get the end pel offset nibble |
|  | shr | al,1 | ;and shift into least significant |
|  | shr | al,1 | ;four bits |
|  | shr | al,1 |  |
|  | shr | al,1 |  |
|  | mov | ENDPEL,al | ;and store runs ending pel offset |
|  | pop | di | ;restore Regen buffer segment |
|  | pop | es | ;and offset to last color byte |
|  | ret |  |  |
| READLIST | endp |  |  |
| DATASIZE | proc | near | ;FIND NEW PEL PATTERN X&Y DIMENSIONS |
|  | push | es | ;save Regen buffer segment |
|  | push | di | ;and offset to last color byte |
|  | mov | es,RCB.NEWPATSG | ;point es to new pattern segment |
|  | mov | di,RCB.NEWPATOF | ;offet to start of new pattern array |
|  | mov | ax,es:[di] | ;get starting word, which is x dim |
|  | shr | ax,1 | ;in bits, divided by 2 |
|  | mov | XPELS,ax | ;to get pels |
|  | and | ax,3 | ;ax = number of pels in last byte |
|  | jnz | D1 | ;except if ax = 0 |
|  | mov | al,4 | ;then, have four |
| D1: |  |  |  |
|  | mov | XTRA,al | ;and store into XTRA |
|  | mov | ax,XPELS | ;from the number of pels in a line |
|  | shr | ax,1 | ;shift once |
|  | shr | ax,1 | ;and once again to get byte count |
|  | cmp | XTRA,4 | ;if last byte has four pels |
|  | je | D2 | ;then number of bytes found |
|  | inc | ax | ;else have one more |
| D2: |  |  |  |
|  | mov | XBYTES,ax | ;save the number of bytes in a line |
|  | inc | di | ;get next word |
|  | inc | di |  |
|  | mov | ax,es:[di] | ;get data |
|  | mov | YLINES,ax | ;get y dim in lines |
|  | cmp | XTRA,4 | ;if last byte has less than 4 pels |
|  | jne | D21 | ;not finished |
|  | cmp | SAVEXTRA,0 | ;or if original data less than 4 pels |
|  | jne | D21 | ;not finished |
|  | jmp | D9 | ;else finished |
| D21: |  |  |  |
|  | inc | di | ;else point to first data word |
|  | inc | di |  |
|  | mov | cx,YLINES | ;set loop count to number of lines |
| D8: |  |  |  |
|  | push | cx | ;save loop count |
|  | mov | al,es:[di] | ;get first data byte |
|  | cmp | SAVEXTRA,0 | ;if original data less than 4 pels |
|  | jne | D8001 | ;then, restore original value of XTRA |
|  | cmp | XBYTES,1 | ;if number of data bytes in line > 1 |
|  | jne | D808 | ;then fill in last byte differently |
|  | mov | cl,XTRA | ;else, the original number of pels is |
|  | mov | SAVEXTRA,cl | ;saved |
|  | jmp | D8002 | ;and not restored |
| D8001: |  |  | ;restore original number of pels |
|  | mov | cl,SAVEXTRA | ;which is contained in SAVEXTRA |
|  | mov | XTRA,cl | ;and placed in back in XTRA |
| D8002: |  |  | ;LESS THAN FOUR PELS PER LINE |
|  | cmp | XTRA,1 | ;if not single pel |
|  | jne | D801 | ;haven't found pel count |
|  | mov | cl,2 | ;single pel, so shift count is two |
|  | mov | ah,al | ;and pattern data is moved to ah |
|  | and | ah,0c0h | ;restore original pattern data in ah |
|  | xor | al,al | ;zero al |
|  | mov | dl,ah | ;shift original pel right by |
|  | shr | dl,cl | ;one pel |
|  | add | al,dl | ;and store into al |
|  | shr | dl,cl | ;shift original pel twice |
|  | add | al,dl | ;al now contains data for two pels |
|  | shr | dl,cl | ;shift original pel three times |
|  | add | al,dl | ;al now contains data for three pels |
|  | mov | XTRA,4 | ;data byte repeated as is in fill |
|  | jmp | D809 | ;and enter modified data into array |

TABLE 1-continued

Assembly-level Sequence for Ascertaining and Filling
of Bounded Areas of a Colored Raster Display
© Copyright 1984 IBM Corporation

```
D801:
           cmp    XTRA,2              ;if not two pels
           jne    D802                ;then pel count must be three
           mov    cl,4                ;two pels, so shift count is four
           mov    ah,al               ;and pattern data is moved to ah
           and    ah,0f0h             ;restore original pattern data in ah
           mov    al,ah               ;and into al
           shr    al,cl               ;shift original pel right by two pels
           mov    XTRA,4              ;data byte repeated as is in fill
           jmp    D809                ;and enter modified data into array
D802:
           mov    cl,6                ;three pels, so shift count is six
           mov    ah,al               ;and pattern data is moved to ah
           and    ah,0fch             ;restore original pattern data in ah
           mov    al,ah               ;and into al
           shr    al,cl               ;shift original pel right by 3 pels
           mov    XBYTES,3            ;and treat as if 3 bytes of data
           mov    XTRA,4              ;data byte repeated as is in fill
           jmp    D809                ;and enter modified data into array
D808:
           mov    cl,XTRA             ;and shift the data right by twice
           shl    cl,1                ;the number of extra pels
           shr    al,cl
           neg    cl                  ;and shift the mask left by
           add    cl,8                ;eight minus twice the number of
           mov    bl,0ffh             ;set up mask
           shl    bl,cl               ;extra pels
           add    di,XBYTES           ;add number of x bytes to di
           dec    di                  ;less one to get to last data byte
           mov    ah,es:[di]          ;in line and get it
           and    ah,bl               ;and mask all but data pels
D809:
           cmp    FINAL,0
           jne    D81
           or     ah,al               ;and fill in last byte with pels
D81:
           mov    es:[di],ah          ;from first data byte and store data
           inc    di                  ;point to first byte of next line
           pop    cx                  ;restore loop count
           dec    cx                  ;decrement loop counter
           cmp    cx,0                ;and zero
           jle    D9                  ;finished, else
           jmp    D8                  ;continue filling in last data pel
D9:
           pop    di                  ;restore Regen buffer segment
           pop    es                  ;and offset to last color byte
           ret
DATASIZE   endp
PELENGTH   proc   near                ;find the length of the run in pels
           push   ax
           xor    ax,ax               ;zero ax
           xor    cx,cx               ;and cx
           mov    al,ENDPEL           ;pel run length is
           sub    al,STARTPEL         ;1+ENDPEL−STARTPEL+4*LENBYTE
           inc    al
           cbw
           mov    cl,LENBYTE
           shl    cx,1
           shl    cx,1
           add    cx,ax
           pop    ax
           ret                        ;result returned in cx
PELENGTH   endp
PELRIGHT   proc   near                ;find the length of the run in pels
           push   ax                  ;to the right of the beginning pel
           xor    ax,ax               ;zero ax
           xor    cx,cx               ;and cx
           mov    al,ENDPEL           ;pel run length is
           sub    al,BEGINPEL         ;1+ENDPEL−BEGINPEL+4*RIGHTLEN
           inc    al
           cbw
           mov    cl,RIGHTLEN
           shl    cx,1
           shl    cx,1
           add    cx,ax
           pop    ax
           ret                        ;result returned in cx
PELRIGHT   endp
COMPOS     proc   near                ;adjust start & end pel for composite
```

TABLE 1-continued

Assembly-level Sequence for Ascertaining and Filling of Bounded Areas of a Colored Raster Display
© Copyright 1984 IBM Corporation

```
                push    ax
                mov     al,STARTPEL         ;is starting pel even?
                and     al,1
                je      C2                  ;yes, so don't change
                inc     STARTPEL            ;no, so make even
                cmp     STARTPEL,4          ;crossed byte boundary?
                jl      C2                  ;no
                mov     STARTPEL,0          ;yes, so starting pel is zero
                dec     LENBYTE             ;and run length one byte less
                inc     STRTBYTE            ;and starting byte one more
C2:
                mov     al,ENDPEL           ;is ending pel odd?
                and     al,1
                jne     C3                  ;yes, so don't change
                dec     ENDPEL              ;no, so make odd
                cmp     ENDPEL,0            ;crossed byte boundary?
                jge     C3                  ;no
                mov     ENDPEL,3            ;yes, so ending pel is three and
                dec     LENBYTE             ;run length is one byte less
C3:
                pop     ax
                ret
COMPOS          endp
GETPAT          proc    near                ;find get pattern
                push    es                  ;save Regen buffer segment
                push    cx                  ;and cx
                mov     es,RCB.NEWPATSG     ;point es to new pattern segment
                cmp     XTRA,4              ;is last byte of get data full?
                jne     G1                  ;no
                cmp     SAVEXTRA,3          ;does original data only have 3 pels?
                jne     G002                ;no
                cmp     INIT,1              ;yes, first time for this line
                jne     G001                ;no
                mov     al,es:[bx]          ;yes, so get first byte of data
                mov     MAKEPAT[0],al       ;and this is first byte of pattern
                mov     cl,2                ;shift count of two
                shl     al,cl               ;shift data left by two
                mov     ah,al               ;and save in ah
                mov     cl,6                ;shift count of six
                shr     al,cl               ;get first pel repeated in fourth pel
                or      al,ah               ;position
                mov     MAKEPAT[1],al       ;and this is second byte of pattern
                mov     cl,2                ;shift count of two
                shl     al,cl               ;shift data left by two
                mov     ah,al               ;and save in ah
                mov     cl,6                ;shift count of six
                shr     al,cl               ;get first pel repeated in fourth pel
                or      al,ah               ;position
                mov     MAKEPAT[2],al       ;and this is third byte of pattern
G001:
                mov     al,MAKEPAT[si]      ;get put pattern data
                jmp     G2
G002:
                mov     al,es:[bx][si]      ;get first byte of put pattern data
                jmp     G2
G1:
                cmp     XTRA,2              ;no, last byte of get data half full?
                je      G01                 ;yes
                cmp     XTRA,1              ;no, last byte of get data has 1 pel?
                je      G02                 ;yes
                jmp     G03                 ;no, last byte of get data has 3 pels
G01:
                mov     ax,es:[bx][si]      ;get first word of put pattern data
                cmp     SHIFT,0             ;if don't need to shift
                je      G2                  ;then found get data byte = al
                xchg    al,ah               ;else, put two bytes into correct
                mov     cl,SHIFT            ;into correct order, and shift right
                shl     cl,1                ;SHIFT pels or twice as many bits
                shr     ax,cl               ;shift right
                jmp     G2                  ;to get correct pattern into al
G02:
                mov     ax,es:[bx][si]      ;get first word of put pattern data
                cmp     SHIFT,0             ;if don't need to shift
                je      G2                  ;then found get data byte = al
                xchg    al,ah               ;else, put two bytes into correct
                mov     cl,SHIFT            ;into correct order, and shift right
                shl     cl,1                ;SHIFT pels or twice as many bits
                shr     ax,cl               ;shift right
                jmp     G2                  ;to get correct pattern into al
```

TABLE 1-continued
Assembly-level Sequence for Ascertaining and Filling of Bounded Areas of a Colored Raster Display
© Copyright 1984 IBM Corporation

```
G03:
        cmp     INIT,1                  ;if not first time
        jne     G031                    ;then, already found boundary word
        push    si                      ;else, save pattern pointer
        mov     ax,es:[bx]              ;get first word of pattern data
        xchg    al,ah                   ;and put in correct order
        mov     cl,6                    ;shift data right by 3 pels
        shr     ax,cl                   ;and al contains pels 1,2,3, and 4
        mov     si,XBYTES               ;point to last data byte
        dec     si
        mov     ah,es:[bx][si]          ;get last byte of pattern data into
        mov     BOUNDARY,ax             ;ah and store ax, the boundary word
        pop     si                      ;restore pattern pointer
G031:
        mov     ax,es:[bx][si]          ;get first word of put pattern data
        cmp     SHIFT,4                 ;if don't need to shift
        je      G2                      ;then found get data byte = al
        xchg    al,ah                   ;else, put two bytes into correct
        mov     cx,XBYTES               ;if si doesn't point to last data
        dec     cx                      ;byte, then have ax
        cmp     si,cx
        jl      G04
        mov     ax,BOUNDARY             ;else get ax from boundary word
G04:
        mov     cl,SHIFT                ;into correct order, and shift right
        shl     cl,1                    ;SHIFT pels or twice as many bits
        shr     ax,cl                   ;shift right
        jmp     G2                      ;to get correct pattern into al
G2:
        pop     cx                      ;restore cx
        pop     es                      ;restore Regen buffer segment
        ret
GETPAT  endp
NEXTPTR proc    near
        inc     si                      ;update si and if
        cmp     XTRA,4                  ;is last byte of get data full?
        jne     N002                    ;yes
        cmp     si,XBYTES               ;si doesn't point to end of data
        jne     N001                    ;keep it
        xor     si,si                   ;else, reset to start of data
N001:
        jmp     N3
N002:
        cmp     XTRA,2                  ;no, last byte of get data half full?
        je      N01                     ;yes
        cmp     XTRA,1                  ;no, last byte of get data has 1 pel?
        je      N1                      ;yes
        jmp     N13                     ;no, last byte has 3 pels
N01:
        cmp     SHIFT,0                 ;no, so is shift flag set
        jne     N02                     ;yes
        cmp     si,XBYTES               ;no, so looking past last data byte?
        jl      N3                      ;no
        mov     SHIFT,2                 ;yes, so set shift flag hi
        xor     si,si                   ;and zero x data offset pointer
        jmp     N3
N02:                                    ;shift flag set
        mov     ax,XBYTES               ;looking at last data byte?
        dec     ax
        cmp     si,ax
        jl      N3                      ;no
        mov     SHIFT,0                 ;yes, so set shift flag low
        xor     si,si                   ;and zero x data offset pointer
        jmp     N3
N1:                                     ;last byte has one pel
        cmp     SHIFT,0                 ;is shift flag set?
        jne     N11                     ;yes
        cmp     si,XBYTES               ;no, so looking past last data byte?
        jl      N3                      ;no
        inc     SHIFT                   ;yes, so increment shift flag
        xor     si,si                   ;and zero x data offset pointer
        jmp     N3
N11:                                    ;shift flag set
        mov     ax,XBYTES               ;looking at last data byte?
        dec     ax
        cmp     si,ax
        jl      N3                      ;no
        xor     si,si                   ;and zero x data offset pointer
        inc     SHIFT                   ;yes, so increment shift flag
```

TABLE 1-continued

Assembly-level Sequence for Ascertaining and Filling
of Bounded Areas of a Colored Raster Display
© Copyright 1984 IBM Corporation

```
               cmp     SHIFT,4              ;is shift flag equal to four?
               jl      N12                  ;no
               mov     SHIFT,0
N12:
               jmp     N3
N13:                                        ;last byte has three pels
               cmp     SHIFT,1              ;is shift flag equal to one?
               je      N14                  ;yes
               cmp     si,XBYTES            ;no, so looking past last data byte?
               jl      N3                   ;no
               dec     SHIFT                ;yes, so decrement shift flag
               xor     si,si                ;and zero x data offset pointer
               jmp     N3
N14:                                        ;shift flag set to one
               mov     ax,XBYTES            ;looking at last data byte?
               dec     ax
               cmp     si,ax
               jl      N3                   ;no
               xor     si,si                ;and zero x data offset pointer
               mov     SHIFT,4              ;yes, so increment shift flag
               jmp     N3
N3:
               ret                          ;returns si
NEXTPTR        endp
FILLIT         proc    near
               call    RPARMS               ;Get control block data
               mov     RCB.ERROR,0          ;Set error code to zero
                                            ;INITIALIZATION
               cmp     RCB.VALIDRUN,4       ;if number of pels for valid run is
               jg      F01                  ;greater than four or
               cmp     RCB.VALIDRUN,0       ;less than zero
               jl      F01                  ;then, have error, else if
               jg      F02                  ;between one and four, find new list
               jmp     STEP15               ;else, equal to zero, so use old list
F01:
               mov     RCB.ERROR,3          ;report error
               jmp     ENDIT                ;and no further processing needed
F02:
               xor     ax,ax                ;zero ax
               mov     RUNCNT,ax            ;and the current run's counter
               mov     RUNCNTP,ax           ;and the parent run's counter
               mov     ANOTHER,al           ;and run's starting data not known
               mov     bx,offset RCB.OLDPAT ;decode the two word pel pattern
               mov     ax,[bx]              ;by getting the first word and
               mov     PELPAT[0],al         ;finding the first byte
               mov     PELPAT[1],ah         ;and the second byte
               inc     bx                   ;get the next word and
               inc     bx
               mov     ax,[bx]
               mov     PELPAT[2],al         ;find the third byte
               mov     PELPAT[3],ah         ;and the fourth byte
               mov     dx,LASTLINE          ;dx = line number
               call    LINE2OFF             ;convert line number to byte offset
               mov     LINE199,ax           ;ax = byte offset
               mov     ax,RCB.RUNLEN        ;ax = Run buffer length
               mov     dx,RCB.RUNOFF        ;the LIST1 pointer begins at
               test    dx,1                 ;the first word in the Run buffer.
               je      F1                   ;on word boundary, so store beginning
               inc     dx                   ;not on word boundary, force it there
               dec     ax                   ;and length is one less now
F1:
               mov     LIST1PTR,dx          ;save LIST1 pointer
               mov     STRTLST1,dx          ;which is also start of LIST1
               shr     ax,1                 ;RUN buffer length / 2 = word length,
               shr     ax,1                 ;and divide by two again for middle
               shl     ax,1                 ;multiplied by two to get bytes
               mov     LIST1LEN,ax          ;is the length of LIST1 in bytes
               add     ax,STRTLST1          ;the start of LIST2 is the start of
               dec     ax                   ;the LIST1 buffer ends one word
               dec     ax                   ;(two bytes)
               mov     MAXSIZE,ax           ;before start of LIST2 buffer
               mov     ax,RCB.STRTCOL       ;the last two bits of the starting
               and     ax,3                 ;column give the
               mov     BEGINPEL,al          ;beginning pel offset
               mov     dx,RCB.STRTLINE      ;put starting line in dx
               call    LINE2OFF             ;get beginning line offset in ax
               mov     dx,ax                ;dx = beginning line offset
               mov     ax,RCB.STRTCOL       ;the starting column is
               shr     ax,1                 ;shifted right twice to get
```

TABLE 1-continued
Assembly-level Sequence for Ascertaining and Filling
of Bounded Areas of a Colored Raster Display
© Copyright 1984 IBM Corporation

|     |       |                |                                              |
| --- | ----- | -------------- | -------------------------------------------- |
|     | shr   | ax,1           | ;the byte offset within the line             |
|     | add   | ax,dx          | ;add byte offset on line to total            |
|     | mov   | STRTBYTE,ax    | ;store as starting byte for first run        |
|     | mov   | ax,dx          | ;from line's starting byte                   |
|     | add   | ax,DCB.DESOFF  | ;add Regen buffer offset to get              |
|     | mov   | BEGNLINE,ax    | ;line's starting byte offset                 |
|     | add   | ax,DCB.DESBSL  | ;add dest. bytes per line                    |
|     | dec   | ax             | ;less one to get the line's                  |
|     | mov   | ENDLINE,ax     | ;ending byte offset                          |
|     | mov   | es,DCB.DESSEG  | ;point es to Regen buffer segment            |
|     | mov   | di,DCB.DESOFF  | ;di = Regen buffer offset to                 |
|     | add   | di,STRTBYTE    | ;start byte                                  |
|     | mov   | si,RCB.STRTLINE| ;si = offset into PELPAT array               |
|     | and   | si,3           |                                              |
| F2: |       |                | ;INITIALIZATION FOR RUN                      |
|     | xor   | ax,ax          | ;zero ax                                     |
|     | mov   | LENBYTE,al     | ;and run's byte length                       |
|     | mov   | STARTPEL,al    | ;and run's starting pel offset               |
|     |       |                | ;DOES RUN EXTEND LEFT TO BYTE BORDER?        |
|     | mov   | ch,0ffh        | ;ch = bit mask                               |
|     | mov   | MATCH,0        | ;no byte match yet                           |
|     | mov   | BEGNBYTE,di    | ;save beginning byte                         |
|     | mov   | dh,es:[di]     | ;get color byte                              |
|     | mov   | ah,dh          | ;also store into ah                          |
|     | mov   | dl,PELPAT[si]  | ;get pel pattern to match                    |
|     | mov   | al,dl          | ;also store into dl                          |
|     | mov   | cl,3           | ;find number of pels right of                |
|     | sub   | cl,BEGINPEL    | ;beginning pel to byte boundary              |
|     | shl   | cl,1           | ;convert to bits (2/pel)                     |
|     | shl   | ch,cl          | ;don't care if these bits match              |
|     | and   | al,ch          | ;mask pel pattern byte                       |
|     | and   | ah,ch          | ;mask color byte                             |
|     | cmp   | al,ah          | ;do they match?                              |
|     | jne   | F22            | ;no                                          |
|     | mov   | MATCH,1        | ;yes, so set match flag hi                   |
|     |       |                | ;FIND ALL BYTES THAT MATCH PATTERN           |
| F21:|       |                |                                              |
|     | cmp   | di,BEGNLINE    | ;if color byte first byte in line            |
|     | jg    | F211           |                                              |
|     | jmp   | F3             | ;then finished, else                         |
| F211:|      |                |                                              |
|     | dec   | di             | ;travel left to next color byte              |
|     | mov   | dh,es:[di]     | ;get it                                      |
|     | cmp   | dh,dl          | ;compare match pattern & color byte          |
|     | jne   | F22            | ;doesn't match                               |
|     | dec   | STRTBYTE       | ;matches, so have new starting point         |
|     | inc   | LENBYTE        | ;and byte length increased by one            |
|     | jmp   | F21            | ;see if next byte also matches               |
| F22:|       |                |                                              |
|     |       |                | ;FIND PEL MATCHES                            |
|     | cmp   | MATCH,0        | ;if no bytes match, use different            |
|     | je    | F26            | ;method in finding pel level matches         |
|     | mov   | bl,1           | ;bl = startpel                               |
|     | xor   | cx,cx          | ;zero cx                                     |
|     | mov   | cl,3fh         | ;cl = mask, ch = loop counter                |
| F23:|       |                |                                              |
|     | mov   | al,dl          | ;al = match pattern                          |
|     | mov   | ah,dh          | ;ah = color byte                             |
|     | and   | al,cl          | ;mask match pattern                          |
|     | and   | ah,cl          | ;and color byte                              |
|     | cmp   | al,ah          | ;compare                                     |
|     | je    | F24            | ;match found, so exit loop                   |
|     | shr   | cl,1           | ;match not found, so check match for         |
|     | shr   | cl,1           | ;one less pel (two bits)                     |
|     | inc   | bl             | ;increment startpel                          |
|     | inc   | ch             | ;increment loop count                        |
|     | cmp   | ch,3           | ;tested all three pels?                      |
|     | jl    | F23            | ;no                                          |
|     | xor   | bl,bl          | ;yes & no match so zero pel offset           |
|     | jmp   | F25            | ;and don't update run variables              |
| F24:|       |                | ;got a pel level match                       |
|     | dec   | STRTBYTE       | ;so new run start byte                       |
|     | inc   | LENBYTE        | ;and run length greater by one byte          |
| F25:|       |                |                                              |
|     | mov   | STARTPEL,bl    | ;update run's starting pel                   |
|     | jmp   | F3             | ;and check for identical run                 |
| F26:|       |                | ;PEL MATCHES WHEN MATCH EQUALS ZERO          |
|     | mov   | bl,BEGINPEL    | ;bl = startpel                               |
|     | cmp   | bl,2           | ;check for one pel match to left             |

TABLE 1-continued
Assembly-level Sequence for Ascertaining and Filling of Bounded Areas of a Colored Raster Display
© Copyright 1984 IBM Corporation

|       | je    | F27          | ;check for one and two pel match |
|-------|-------|--------------|----------------------------------|
|       | cmp   | bl,3         |                                  |
|       | je    | F28          | ;to left                         |
|       | jmp   | F29          | ;startpel is beginpel            |
| F27:  |       |              | ;begin pel offset of 2           |
|       | mov   | cl,30h       | ;cl = mask                       |
|       | mov   | al,dl        | ;al = match pattern              |
|       | mov   | ah,dh        | ;ah = color byte                 |
|       | and   | al,cl        | ;mask match pattern              |
|       | and   | ah,cl        | ;and color byte                  |
|       | cmp   | al,ah        | ;compare                         |
|       | jne   | F29          | ;no match, don't decrement start pel |
|       | dec   | bl           | ;match, so decrement start pel   |
|       | jmp   | F29          |                                  |
| F28:  |       |              | ;begin pel offset of 3           |
|       | mov   | cl,0ch       | ;cl = mask for one pel to left   |
|       | mov   | al,dl        | ;al = match pattern              |
|       | mov   | ah,dh        | ;ah = color byte                 |
|       | and   | al,cl        | ;mask match pattern              |
|       | and   | ah,cl        | ;and color byte                  |
|       | cmp   | al,ah        | ;compare                         |
|       | jne   | F29          | ;no match, don't decrement start pel |
|       | dec   | bl           | ;match, so decrement start pel   |
|       | mov   | cl,3ch       | ;cl = mask for two pels to left  |
|       | mov   | al,dl        | ;al = match pattern              |
|       | mov   | ah,dh        | ;ah = color byte                 |
|       | and   | al,cl        | ;mask match pattern              |
|       | and   | ah,cl        | ;and color byte                  |
|       | cmp   | al,ah        | ;compare                         |
|       | jne   | F29          | ;no match, don't decrement start pel |
|       | dec   | bl           | ;match, so decrement start pel   |
| F29:  |       |              |                                  |
|       | mov   | STARTPEL,bl  | ;update run's starting pel       |
| F3:   |       |              | ;CHECK FOR IDENTICAL RUN ON LISTS |
|       | mov   | INTABLE,0    | ;run not yet identified in table |
|       | push  | es           | ;save Regen buffer segment       |
|       | push  | di           | ;and offset to last color byte   |
|       | mov   | es,RCB.RUNSEG | ;point es to Run buffer segment |
|       | mov   | di,STRTLST1  | ;di = start of LIST1             |
|       | mov   | ax,STRTBYTE  | ;word to match                   |
|       | mov   | cx,LIST1PTR  | ;number of runs in LIST1         |
|       | sub   | cx,STRTLST1  |                                  |
|       | shr   | cx,1         | ;is number of bytes/2            |
| F301: |       |              |                                  |
|       | cmp   | cx,0         | ;if this is first run            |
|       | je    | F30          | ;don't do search                 |
|       | repne | scasw        | ;search all runs for match       |
|       | je    | F31          | ;match found, so search LIST2    |
| F30:  |       |              |                                  |
|       | pop   | di           | ;restore Regen buffer segment    |
|       | pop   | es           | ;and offset to last color byte   |
|       | jmp   | F4           | ;no match, gather remaining run data |
| F31:  |       |              |                                  |
|       | dec   | di           | ;recover offset from start of LIST1 |
|       | dec   | di           | ;where word match found          |
|       | add   | di,LIST1LEN  | ;get offset into LIST2           |
|       | mov   | dx,es:[di]   | ;get data                        |
|       | mov   | ax,dx        | ;and also store in ax            |
|       | and   | al,0fh       | ;starting pel offset for run in LIST1 |
|       | cmp   | al,STARTPEL  | ;compare with new run's starting pel |
|       | jne   | F32          | ;no match, continue search       |
|       | mov   | INTABLE,1    | ;match, so set flag hi           |
|       | jmp   | F33          |                                  |
| F32:  |       |              |                                  |
|       | sub   | di,LIST1LEN  | ;get back offset into LIST1      |
|       | inc   | di           | ;look at next word from          |
|       | inc   | di           | ;where word match found          |
|       | mov   | ax,STRTBYTE  | ;word to match                   |
|       | jmp   | F301         |                                  |
| F33:  |       |              |                                  |
|       | pop   | di           | ;restore Regen buffer segment    |
|       | pop   | es           | ;and offset to last color byte   |
| F4:   |       |              | ;DOES RUN EXTEND RIGHT TO BYTE BORDER |
|       | cmp   | ANOTHER,0    |                                  |
|       | je    | F401         |                                  |
|       | mov   | LENBYTE,0    | ;zero run's byte length          |
| F401: |       |              |                                  |
|       | mov   | ENDPEL,3     | ;run's ending pel offset set to 3 |
|       | mov   | ch,0ffh      | ;ch = bit mask                   |

TABLE 1-continued
Assembly-level Sequence for Ascertaining and Filling of Bounded Areas of a Colored Raster Display
© Copyright 1984 IBM Corporation

```
               mov    MATCH,0           ;no byte match yet
               xor    bh,bh             ;bh = byte length increases
               mov    di,BEGNBYTE       ;start from beginning byte
               mov    dh,es:[di]        ;get color byte
               mov    ah,dh             ;also store into ah
               mov    dl,PELPAT[si]     ;get pel pattern to match
               mov    al,dl             ;also store into dl
               mov    cl,BEGINPEL       ;find number of pels left of
                                        ;beginning pel to byte boundary
               shl    cl,1              ;convert to bits (2/pel)
               shr    ch,cl             ;don't care if these bits match
               and    al,ch             ;mask pel pattern byte
               and    ah,ch             ;mask color byte
               cmp    al,ah             ;do they match?
               jne    F42               ;no
               mov    MATCH,1           ;yes, so set match flag hi
                                        ;FIND ALL BYTES THAT MATCH PATTERN
F41:
               cmp    di,ENDLINE        ;if color byte last byte in line
               jl     F411
               jmp    F451              ;then finished, else
F411:
               inc    di                ;travel right to next color byte
               mov    dh,es:[di]        ;get it
               cmp    dh,dl             ;compare match pattern & color byte
               jne    F42               ;doesn't match
               inc    LENBYTE           ;matches, byte length increased by 1
               inc    bh
               jmp    F41               ;see if next byte also matches
F42:
                                        ;FIND PEL MATCHES
               cmp    MATCH,0           ;if no bytes match, use different
               je     F46               ;method in finding pel level matches
               mov    bl,2              ;bl = endpel
               xor    cx,cx             ;zero cx
               mov    cl,0fch           ;cl = mask, ch = loop counter
F43:
               mov    al,dl             ;al = match pattern
               mov    ah,dh             ;ah = color byte
               and    al,cl             ;mask match pattern
               and    ah,cl             ;and color byte
               cmp    al,ah             ;compare
               je     F44               ;match found, so exit loop
               shl    cl,1              ;match not found, so check match for
               shl    cl,1              ;one less pel (two bits)
               dec    bl                ;decrement endpel
               inc    ch                ;increment loop count
               cmp    ch,3              ;tested all three pels?
               jl     F43               ;no
               mov    bl,3              ;yes; no match so pel offset is 3
               jmp    F45               ;and don't update run length
F44:                                    ;got a pel level match
               inc    LENBYTE           ;run length greater by one byte
               inc    bh
F45:
               mov    ENDPEL,bl         ;update run's ending pel
F451:
               mov    RIGHTLEN,bh       ;and amount byte length increased
               jmp    F5                ;and put run on LIST1 and LIST2
F46:                                    ;not on byte boundary
               mov    bl,BEGINPEL       ;bl = endpel
               cmp    bl,1              ;check for one pel match to right
               je     F47
               cmp    bl,0              ;check for one and two pel match
               je     F48               ;to right
               jmp    F49               ;endpel is beginpel
F47:                                    ;begin pel offset of 1
               mov    cl,0ch            ;cl = mask
               mov    al,dl             ;al = match pattern
               mov    ah,dh             ;ah = color byte
               and    al,cl             ;mask match pattern
               and    ah,cl             ;and color byte
               cmp    al,ah             ;compare
               jne    F49               ;no match, don't increment end pel
               inc    bl                ;match, so increment end pel
               jmp    F49
F48:                                    ;begin pel offset of 0
               mov    cl,30h            ;cl = mask for one pel to right
               mov    al,dl             ;al = match pattern
```

TABLE 1-continued
Assembly-level Sequence for Ascertaining and Filling of Bounded Areas of a Colored Raster Display
© Copyright 1984 IBM Corporation

```
              mov     ah,dh               ;ah = color byte
              and     al,cl               ;mask match pattern
              and     ah,cl               ;and color byte
              cmp     al,ah               ;compare
              jne     F49                 ;no match, don't increment end pel
              inc     bl                  ;match, so increment end pel
              mov     cl,3ch              ;cl = mask for two pels to right
              mov     al,dl               ;al = match pattern
              mov     ah,dh               ;ah = color byte
              and     al,cl               ;mask match pattern
              and     ah,cl               ;and color byte
              cmp     al,ah               ;compare
              jne     F49                 ;no match, don't increment end pel
              inc     bl                  ;match, so increment end pel
F49:
              mov     ENDPEL,bl           ;update run's ending pel
              mov     RIGHTLEN,bh         ;and amount byte length increased
F5:                                       ;PUT RUN DATA ON LIST1 AND LIST2
              cmp     INTABLE,0           ;if run is unique, then
              je      F51                 ;place data on LISTS
              jmp     STEP10              ;else, look for more children
F51:
              mov     bx,RCB.VALIDRUN     ;DETERMINE IF RUN OF VALID LENGTH
              call    PELRIGHT            ;get lenth of run to the right
              cmp     RCB.COMPOSIT,0      ;in composite mode?
              je      F511                ;no
              mov     al,BEGINPEL         ;yes, is beginning pel odd?
              and     al,1
              je      F511                ;no
              inc     bx                  ;yes, so increment valid run length
F511:
              cmp     cx,bx               ;compare with valid run length
              jge     F54                 ;OK
              mov     ax,LIST1PTR         ;is very first run not valid?
              cmp     ax,STRTLST1
              je      F53                 ;yes
              mov     di,BEGNBYTE         ;restore beginning byte
              mov     ax,BEGNBYTE         ;restore STRTBYTE. BEGNBYTE minus
              sub     ax,DCB.DESOFF       ;destination offset
              mov     STRTBYTE,ax         ;is starting byte from STEP 9
              jmp     STEP11              ;continue looking
F53:
              mov     RCB.ERROR,2         ;first run not valid, so
              jmp     ENDIT               ;report error and exit
F54:
              push    es                  ;save Regen buffer segment
              push    di                  ;and offset to last color byte
              mov     es,RCB.RUNSEG       ;point es to Run buffer segment
              mov     di,LIST1PTR         ;offset into LIST1 is at LIST1PTR
              mov     ax,STRTBYTE         ;put run's starting byte into
              mov     es:[di],ax          ;LIST1
              add     di,LIST1LEN         ;point into LIST2
              mov     al,ENDPEL           ;LIST2 first entry is end pel offset
              shl     al,1                ;which is the high nibble
              shl     al,1                ;so, shift four times
              shl     al,1                ;to convert it from low nibble
              shl     al,1                ;second entry is start pel offset
              add     al,STARTPEL         ;nibble, and last entry is run's
              mov     ah,LENBYTE          ;length in bytes.
              mov     es:[di],ax          ;store these entries on LIST2
              pop     di                  ;restore Regen buffer segment
              pop     es                  ;and offset to last color byte
              inc     RUNCNT              ;increment current run count
              inc     LIST1PTR            ;and LIST1 pointer
              inc     LIST1PTR            ;by two bytes (one word)
              mov     ax,LIST1PTR         ;check if run's data offset into
              cmp     ax,MAXSIZE          ;LIST1 exceeds maximum size
              jle     F55                 ;no, still OK
              mov     RCB.ERROR,1         ;yes, report error
              jmp     STEP15              ;and fill LIST1 runs
F55:
              cmp     RUNCNTP,0           ;if no more parents
              je      STEP7               ;then, children become new parents
              jmp     STEP10              ;else, look for more children
STEP7:                                    ;CHILDREN ARE NOW THE PARENT RUNS
              mov     cx,RUNCNT
              cmp     cx,0                ;if current run list is not zero
              jne     F6                  ;continue looking for more children
              jmp     STEP15              ;else, finished and put runs on screen
```

TABLE 1-continued
Assembly-level Sequence for Ascertaining and Filling of Bounded Areas of a Colored Raster Display
© Copyright 1984 IBM Corporation

```
F6:
        shl     cx,1                ;subtract the current runs times two
        mov     ax,LIST1PTR         ;from the old pointer to get pointer
        sub     ax,cx               ;to the
        mov     LISTPTRP,ax         ;children runs
        mov     ax,RUNCNT           ;the past run count is updated
        mov     RUNCNTP,ax          ;to the current run count
        mov     RUNCNT,0            ;and the current run count is zeroed
STEP8:                              ;LOOK UP FOR NEW CHILDREN
        mov     ANOTHER,0           ;and run's starting data not known
        mov     DOWN,0              ;going up
        mov     ax,LISTPTRP         ;from this parent
        call    READLIST            ;decode the entries in LIST1 & LIST2
        mov     ax,DCB.DESFRM       ;If the frame offset is 0 then there
        cmp     ax,0                ;is no alternating between frames
        jz      F71                 ;Else determine which frame contains
        mov     FRAME,1             ;the first line of the change area.
        mov     ax,STRTBYTE         ;If offset to start byte is greater
        cmp     ax,DCB.DESFRM       ;than the frame size then the offset
        jl      F71                 ;points to second frame. Set FRAME
        mov     FRAME,2             ;to 1 for first frame, etc. F71:
        mov     ax,FRAME            ;Save frame
        mov     FRAMESAV,ax
        mov     di,STRTBYTE         ;from the starting byte
        mov     ATTOP,0             ;haven't done top of screen check
        cmp     di,DCB.DESBSL       ;go up unless already at top
        jge     F72
        mov     ATTOP,1
        jmp     F73
F72:
        call    FRMCHNG             ;and go up one line
        cmp     DCB.DESFRM,0        ;when frame offset is not zero.
        jnz     F73                 ;when frame offset zero
        sub     di,DCB.DESBSL       ;also go up one line
F73:
        mov     STRTBYTE,di         ;get new starting byte
        add     di,DCB.DESOFF       ;add the Regen buffer offset
        call    OFF2LINE            ;determine new BEGNLINE & ENDLINE
        shl     dx,1                ;dx = byte offset into the line
        shl     dx,1                ;is multiplied by 4 to get pel offset
        xor     cx,cx               ;zero cx
        mov     cl,STARTPEL         ;cx = start pel offset
        add     dx,cx               ;and the start pel offset is added to
        mov     BEGINCOL,dx         ;get the beginning column number
        mov     BEGCOLSV,dx         ;which is also saved for latter use
        call    PELENGTH            ;the pel length returned in cx
        add     cx,BEGINCOL         ;is added to the beginning column
        dec     cx                  ;less one
        mov     PARNTEND,cx         ;to get the ending column
        cmp     ATTOP,1             ;is parent at top of screen?
        jne     F74                 ;no
        jmp     STEP12              ;yes, so go down a line
F74:
        mov     dx,ax               ;move line number into dx
        mov     si,ax               ;and si
        and     si,3                ;get pel pattern to match
        call    LINE2OFF            ;get beginning line offset in ax
        add     ax,DCB.DESOFF       ;add Regen buffer offset to get
        mov     BEGNLINE,ax         ;line's starting byte offset
        add     ax,DCB.DESBSL       ;add dest. bytes per line
        dec     ax                  ;less one to get the line's
        mov     ENDLINE,ax          ;ending byte offset
        mov     al,STARTPEL         ;put startpel
        mov     BEGINPEL,al         ;as beginning pel for this run
STEP9:                              ;CHECK FOR NEW RUNS
        mov     dh,es:[di]          ;dh = color byte
        mov     dl,PELPAT[si]       ;dl = pel pattern to match
        mov     ch,0c0h             ;mask for start pel offset = 0
        mov     cl,BEGINPEL         ;shift mask right by
        shl     cl,1                ;twice
        shr     ch,cl               ;start pel offset
        and     dh,ch               ;mask color byte
        and     dl,ch               ;mask pel pattern
        cmp     dh,dl               ;match?
        jz      F741
        jmp     STEP11              ;no, so check next pel
F741:
        cmp     ANOTHER,0           ;yes, if not first run
        jne     F75                 ;already found starting data
```

TABLE 1-continued
Assembly-level Sequence for Ascertaining and Filling
of Bounded Areas of a Colored Raster Display
© Copyright 1984 IBM Corporation

|         |      |              |                                          |
|---------|------|--------------|------------------------------------------|
|         | jmp  | F2           | ;else get starting data                  |
| F75:    |      |              |                                          |
|         | mov  | al,BEGINPEL  | ;get starting pel                        |
|         | mov  | STARTPEL,al  |                                          |
|         | mov  | BEGNBYTE,di  | ;and beginning byte                      |
|         | jmp  | F3           | ;check if run unique                     |
| STEP10: |      |              | ;LOOK FOR NEW CHILDREN FROM RUN'S END    |
|         | mov  | ax,BEGNBYTE  | ;BEGNBYTE minus                          |
|         | sub  | ax,DCB.DESOFF| ;destination offset                      |
|         | mov  | STRTBYTE,ax  | ;is starting byte from STEP 9            |
|         | call | PELRIGHT     | ;get length of run to the right          |
|         | inc  | cx           | ;add one to get past non-matching pel    |
|         | add  | BEGINCOL,cx  | ;get new beginning column                |
|         | mov  | ANOTHER,0    | ;another run not yet found               |
|         | mov  | ax,BEGINCOL  | ;if new beginning column past            |
|         | cmp  | ax,PARNTEND  | ;end of parent run                       |
|         | jg   | STEP12       | ;then check down a line                  |
|         | and  | ax,3         | ;else, find new beginning pel            |
|         | mov  | BEGINPEL,al  |                                          |
|         | cmp  | al,1         | ;if new beginning pel is not 0 or 1      |
|         | jg   | F76          | ;then no additional byte boundary        |
|         | inc  | RIGHTLEN     | ;was crossed, else one more boundary     |
| F76:    |      |              | ;was crossed, so mark it                 |
|         | mov  | ANOTHER,1    | ;another run can be found                |
|         | xor  | cx,cx        | ;zero cx                                 |
|         | mov  | cl,RIGHTLEN  |                                          |
|         | cmp  | cx,0         | ;crossed a byte boundary going right?    |
|         | je   | F77          | ;no                                      |
|         | mov  | ax,STRTBYTE  | ;yes, so increment starting byte         |
|         | add  | ax,cx        | ;for every byte boundary crossed         |
|         | mov  | STRTBYTE,ax  |                                          |
|         | add  | ax,DCB.DESOFF| ;add destination offset for              |
|         | mov  | di,ax        | ;Regen buffer offset to starting byte    |
| F77:    |      |              |                                          |
|         | jmp  | STEP9        | ;look for more children                  |
| STEP11: |      |              | ;NO MATCH, TRAVEL RIGHT ONE PEL          |
|         | mov  | ax,BEGINCOL  | ;increment the beginning column          |
|         | inc  | ax           |                                          |
|         | cmp  | ax,PARNTEND  | ;and see if past end of parent run       |
|         | jg   | STEP12       | ;yes, so check down                      |
|         | mov  | BEGINCOL,ax  | ;no, so save new beginning column        |
|         | and  | ax,3         | ;the beginning pel offset is             |
|         | mov  | BEGINPEL,al  | ;found                                   |
|         | cmp  | al,0         | ;check for crossing byte boundary        |
|         | jne  | F78          | ;no                                      |
|         | inc  | STRTBYTE     | ;and increment the starting byte and     |
|         | inc  | di           | ;Regen buffer starting byte pointer      |
| F78:    |      |              |                                          |
|         | jmp  | STEP9        | ;and look for more children              |
| STEP12: |      |              | ;LOOK DOWN FOR NEW CHILDREN              |
|         | cmp  | DOWN,0       | ;look down if                            |
|         | je   | F79          | ;just looked up                          |
|         | jmp  | STEP13       | ;else, finished with this parent         |
| F79:    |      |              |                                          |
|         | mov  | ANOTHER,0    | ;and run's starting data not known       |
|         | mov  | DOWN,1       | ;looking down                            |
|         | mov  | ax,FRAMESAV  | ;recover the parent's FRAME              |
|         | mov  | FRAME,ax     |                                          |
|         | mov  | di,STBYTSAV  | ;and starting byte offset                |
|         | mov  | STRTBYTE,di  |                                          |
|         | cmp  | di,LINE199   | ;if at bottom of the screen              |
|         | jge  | STEP13       | ;get a new parent                        |
|         | add  | di,DCB.DESBSL| ;go down one line                        |
|         | call | FRMCHNG      | ;account for offset between frames       |
|         | mov  | STRTBYTE,di  | ;get new starting byte offset            |
|         | add  | di,DCB.DESOFF| ;and new Regen buffer offset             |
|         | call | OFF2LINE     | ;find line number                        |
|         | mov  | si,ax        | ;move line number into si                |
|         | and  | si,3         | ;get pel pattern to match                |
|         | mov  | dx,ax        | ;move line number into dx                |
|         | call | LINE2OFF     | ;get beginning line offset in ax         |
|         | add  | ax,DCB.DESOFF| ;add Regen buffer offset to get          |
|         | mov  | BEGNLINE,ax  | ;line's starting byte offset             |
|         | add  | ax,DCB.DESBSL| ;add dest. bytes per line                |
|         | dec  | ax           | ;less one to get the line's              |
|         | mov  | ENDLINE,ax   | ;ending byte offset                      |
|         | mov  | ax,BEGCOLSV  | ;recover the parent's beginning column   |
|         | mov  | BEGINCOL,ax  |                                          |
|         | and  | ax,3         | ;and beginning pel offset                |

TABLE 1-continued

Assembly-level Sequence for Ascertaining and Filling
of Bounded Areas of a Colored Raster Display
© Copyright 1984 IBM Corporation

|  |  |  |  |
|---|---|---|---|
|  | mov | BEGINPEL,al |  |
|  | jmp | STEP9 | ;look for children |
| STEP13: |  |  | ;GET THE NEXT PARENT RUN |
|  | dec | RUNCNTP | ;one less parent run |
|  | cmp | RUNCNTP,0 | ;if finished all parent runs |
|  | je | STEP14 | ;then children become parents |
|  | inc | LISTPTRP | ;else, point to next parent |
|  | inc | LISTPTRP | ;which is a word offset from last one |
|  | jmp | STEP8 | ;and look for more children |
| STEP14: |  |  | ;ALL CHILDREN HAVE BEEN FOUND |
|  | jmp | STEP7 | ;children become parents |
| STEP15: |  |  | ;ALL RUNS ARE WRITTEN TO THE SCREEN |
|  | cmp | RCB.NEWPATYP,0 | ;if not a 4 × 4 new pattern, then |
|  | jne | F801 | ;an n × m new pattern |
|  | mov | ax,RCB.NEWPATSG | ;4 × 4, so get the first word, |
|  | mov | NEWPAT[0],al | ;find the first byte |
|  | mov | NEWPAT[1],ah | ;and the second byte |
|  | mov | ax,RCB.NEWPATOF | ;get the second word, |
|  | mov | NEWPAT[2],al | ;find the third byte |
|  | mov | NEWPAT[3],ah | ;and the fourth byte |
|  | jmp | F802 | ;finished decoding pattern |
| F801: |  |  | ;an n × m pattern |
|  | mov | SAVEXTRA,0 | ;last byte pel count not yet found |
|  | mov | FINAL,0 | ;DATASIZE called to initialize data |
|  | call | DATASIZE | ;so find value of n and m |
| F802: |  |  |  |
|  | mov | es,DCB.DESSEG | ;point es to Regen buffer segment |
|  | mov | cx,LIST1PTR | ;initialize run counter |
|  | shr | cx,1 | ;to total number of runs on LIST1 |
|  | mov | bx,STRTLST1 | ;init. run pointer to start of LIST1 |
| F8: |  |  |  |
|  | push | cx | ;save loop count |
|  | push | bx | ;and run pointer |
|  | mov | ax,bx | ;from run pointer |
|  | call | READLIST | ;get run attributes |
|  | cmp | RCB.COMPOSIT,0 | ;in composite mode? |
|  | je | F8021 | ;no |
|  | call | COMPOS | ;yes, so adjust start and end pel |
| F8021: |  |  |  |
|  | mov | di,DCB.DESOFF | ;di = Regen buffer offset to |
|  | add | di,STRTBYTE | ;start byte |
|  | call | OFF2LINE | ;find line number & offset into line |
|  | cmp | RCB.NEWPATYP,0 | ;if not 4 × 4 new pattern, then |
|  | jne | F803 | ;put pattern from 'get' data array |
|  | and | ax,3 | ;else, line number mod 4 |
|  | mov | si,ax | ;is offset for new pattern array |
|  | jmp | F80 |  |
| F803: |  |  |  |
|  | push | dx | ;save offset into line |
|  | xor | dx,dx | ;zero dx |
|  | mov | cx,YLINES | ;divide line number = ax |
|  | div | cx | ;by the number of data lines |
|  | mov | ax,dx | ;and the remainder is multipied by |
|  | mov | cx,XBYTES | ;the number of data bytes to get the |
|  | cmp | SAVEXTRA,0 | ;if original data has > three pels |
|  | je | F80301 | ;original XBYTES found |
|  | mov | cx,1 | ;else original XBYTES was one |
| F80301: |  |  |  |
|  | mul | cx | ;offset to the data for that line |
|  | mov | bx,RCB.NEWPATOF | ;offet to start of new pattern array |
|  | add | bx,4 | ;plus four to get to start of data |
|  | add | bx,ax | ;plus data offset for start of line |
|  | pop | dx | ;recover line offset |
|  | mov | ax,dx | ;ax = offset into line |
|  | xor | dx,dx | ;zero dx |
|  | cmp | XTRA,4 | ;is last byte of get data full? |
|  | jne | F8030 | ;no |
|  |  |  | ;XTRA = 4 |
|  | mov | cx,XBYTES | ;cx = number of data bytes |
|  | div | cx | ;REM(line offset/number × data bytes) |
|  | mov | si,dx | ;is stored into si |
|  | jmp | F80 |  |
| F8030: |  |  |  |
|  | cmp | XTRA,2 | ;no, last byte of get data half full? |
|  | je | F8031 | ;yes |
|  | cmp | XTRA,1 | ;last byte of get data has one pel? |
|  | je | F8033 | ;yes |
|  | jmp | F8036 | ;no, must have three pels |
| F8031: |  |  | ;XTRA = 2 |

TABLE 1-continued
Assembly-level Sequence for Ascertaining and Filling
of Bounded Areas of a Colored Raster Display
© Copyright 1984 IBM Corporation

|        |      |              |                                              |
|--------|------|--------------|----------------------------------------------|
|        | mov  | cx,XBYTES    | ;cx = number of data bytes                   |
|        | mov  | SHIFT,0      | ;no, so set shift flag low                   |
|        | shl  | cx,1         | ;calculate                                   |
|        | dec  | cx           | ;REM(xoffset/(XBYTES*2−1))                   |
|        | div  | cx           | ;to get data byte position                   |
|        | mov  | cx,XBYTES    |                                              |
|        | cmp  | dx,cx        | ;and compare to XBYTES                       |
|        | jl   | F8032        | ;to see if data must be shifted              |
|        | mov  | SHIFT,2      | ;yes, so shift flag set                      |
|        | sub  | dx,cx        | ;and get new data byte position              |
| F8032: |      |              |                                              |
|        | mov  | si,dx        | ;si points to get array data byte            |
|        | jmp  | F80          |                                              |
| F8033: |      |              | ;XTRA = 1                                    |
|        | mov  | cx,XBYTES    | ;cx = number of data bytes                   |
|        | mov  | SHIFT,0      | ;no, so set shift flag low                   |
|        | shl  | cx,1         | ;calculate                                   |
|        | shl  | cx,1         | ;dx = REM(xoffset/(XBYTES*4−3))              |
|        | sub  | cx,3         |                                              |
|        | div  | cx           | ;to get data byte position                   |
|        | mov  | cx,XBYTES    |                                              |
|        | cmp  | dx,cx        | ;and compare dx to XBYTES                    |
|        | jl   | F8035        | ;to see if data must be shifted              |
|        | sub  | dx,cx        | ;and get new data byte position              |
|        | dec  | cx           | ;cx = XBYTES−1                               |
| F8034: |      |              |                                              |
|        | inc  | SHIFT        | ;increment pel shift count                   |
|        | cmp  | dx,cx        | ;and compare dx to XBYTES−1                  |
|        | jl   | F8035        | ;to see if data must be shifted again        |
|        | sub  | dx,cx        | ;yes, so get new data byte position          |
|        | jmp  | F8034        | ;and keep shifting until finished            |
| F8035: |      |              |                                              |
|        | mov  | si,dx        | ;si points to get array data byte            |
|        | jmp  | F80          |                                              |
| F8036: |      |              | ;XTRA = 3                                    |
|        | mov  | cx,XBYTES    | ;cx = number of data bytes                   |
|        | mov  | SHIFT,4      | ;set shift flag to no shift condition        |
|        | shl  | cx,1         | ;calculate                                   |
|        | shl  | cx,1         | ;dx = REM(xoffset/(XBYTES*4−1))              |
|        | dec  | cx           |                                              |
|        | div  | cx           | ;to get data byte position                   |
|        | mov  | cx,XBYTES    |                                              |
|        | cmp  | dx,cx        | ;and compare dx to XBYTES                    |
|        | jl   | F8038        | ;to see if data must be shifted              |
|        | sub  | dx,cx        | ;and get new data byte position              |
| F8037: |      |              |                                              |
|        | dec  | SHIFT        | ;increment pel shift count                   |
|        | cmp  | dx,cx        | ;and compare dx to XBYTES                    |
|        | jl   | F8038        | ;to see if data must be shifted again        |
|        | sub  | dx,cx        | ;yes, so get new data byte position          |
|        | jmp  | F8037        | ;and decrement SHIFT until finished          |
| F8038: |      |              |                                              |
|        | mov  | si,dx        | ;si points to get array data byte            |
| F80:   |      |              | ;SET MASKS AND COUNTER                       |
|        | mov  | al,0ffh      | ;get all ones in al                          |
|        | mov  | cl,STARTPEL  | ;the starting pel offset is                  |
|        | shl  | cl,1         | ;multiplied by two bits/byte                 |
|        | shr  | al,cl        | ;here is the mask for the first byte         |
|        | mov  | dl,al        | ;save it in dl                               |
|        | mov  | al,0ffh      | ;get all ones in al                          |
|        | mov  | cl,ENDPEL    | ;starting with the ending pel offset         |
|        | inc  | cl           | ;add one shift                               |
|        | shl  | cl,1         | ;multiply by two bits/byte                   |
|        | shr  | al,cl        | ;here is the complement mask                 |
|        | xor  | al,0ffh      | ;here is the real mask for last byte         |
|        | mov  | dh,al        | ;save it in dh                               |
|        | cmp  | LENBYTE,0    | ;if run byte length is not zero              |
|        | jne  | F81          | ;write both beginning & ending bytes         |
|        | and  | dl,dh        | ;else write only beginning byte              |
| F81:   |      |              |                                              |
|        |      |              | ;DO A LINE                                   |
|        | cmp  | RCB.NEWPATYP,0 | ;if not 4 × 4 new pattern, then            |
|        | jne  | F810         | ;get put pattern from get array data         |
|        | mov  | al,NEWPAT[si] | ;get current pattern in al                  |
|        | jmp  | F811         |                                              |
| F810:  |      |              |                                              |
|        | mov  | INIT,1       | ;initialize to get boundary word             |
|        | call | GETPAT       | ;find get data byte, returned in al          |
|        | mov  | INIT,0       | ;initialization completed                    |

TABLE 1-continued
Assembly-level Sequence for Ascertaining and Filling of Bounded Areas of a Colored Raster Display
© Copyright 1984 IBM Corporation

```
F811:
        mov     cl,dl                   ;here is the first mask
        xor     cl,0ffh                 ;complement it
        and     es:[di],cl              ;make hole in destination
        mov     cl,dl                   ;get mask back
        and     cl,al                   ;and the pattern byte
        or      es:[di],cl              ;or the result into destination hole
        inc     di                      ;set di to the next byte
        cmp     RCB.NEWPATYP,0          ;if 4 × 4 new pattern, then
        je      F812                    ;don't need to update si
        call    NEXTPTR                 ;update si
F812:
        xor     cx,cx                   ;zero cx
        mov     cl,LENBYTE              ;get the number of whole bytes in cx
        dec     cx                      ;which is LENBYTE less one
        cmp     cx,0                    ;see if count is less than zero
        jl      F83                     ;if so, skip the rest
        je      F82                     ;if count is zero no full bytes
        cmp     RCB.NEWPATYP,0          ;if not 4 × 4 new pattern, then
        jne     F813                    ;write new data bytes each time
        cld                             ;clear direction flag
        rep     stosb                   ;do the line
        jmp     F82                     ;and finished writing bytes
F813:
        call    GETPAT                  ;find get data byte, returned in al
        mov     es:[di],al
        inc     di
        call    NEXTPTR                 ;update si
F814:
        dec     cx
        cmp     cx,0
        jg      F813
F82:
        mov     cl,dh                   ;here is the last mask
        xor     cl,0ffh                 ;complement it
        and     es:[di],cl              ;make hole in destination
        mov     cl,dh                   ;get mask back
        cmp     RCB.NEWPATYP,0          ;if 4 × 4 new pattern, then
        je      F821                    ;don't need new put pattern data
        call    GETPAT                  ;find get data byte, returned in al
F821:
        and     cl,al                   ;and the pattern byte
        or      es:[di],cl              ;or the result into destination hole
F83:
        pop     bx                      ;restore run pointer
        pop     cx                      ;restore run counter
        inc     bx                      ;point to next run which is a
        inc     bx                      ;word offset from current run
        dec     cx                      ;continue until no more runs
        cmp     cx,0
        jle     F9
        jmp     F8
F9:
        cmp     RCB.NEWPATYP,0          ;if 4 × 4 new pattern, then
        je      ENDIT                   ;don't need to clean up get array
        mov     FINAL,1                 ;else, call DATASIZE for last time
        call    DATASIZE
ENDIT:
        ret
FILLIT  endp
;FILL(DCB,RCB)-Flood fills a region whose interior has the pel values
;given by OLDPAT with a new pel pattern given by NEWPAT.
;DCB is the starting address of the disdat stucture.
;RCB is the starting address of the Run control block.
        public  FILL
FILL    proc    far
        jmp     short BEGIN1
        db      'XXXFILLXXX'
BEGIN1:
        push    bp                      ;Save base pointer
        mov     bp,sp                   ;Stack for parameter list
        push    ds                      ;Save data segment
        call    FILLIT                  ;Fill the region
        pop     es                      ;Update RCB for calling program
        mov     bx,[bp+6]               ;Initialize es to calling data seg,
        mov     di,bx                   ;di to destination offset for move.
        mov     si,offset RCB           ;Source offset for move
        mov     cx,size RCB             ;Size of Run Control Block
        repz    movsb                   ;Move contents of RCB
```

TABLE 1-continued
Assembly-level Sequence for Ascertaining and Filling
of Bounded Areas of a Colored Raster Display
© Copyright 1984 IBM Corporation

```
              push    es              ;Restore ds to calling program
              pop     ds
              pop     bp              ;Restore registers
              ret     4               ;Return and delete 2 parms from stack
FILL          endp
XCODE         ends
              end
```

I claim:

1. A method for use in a bit-mapped presentation/display system for ascertaining the boundary of an arbitrarily-shaped, closed polygon filled with a first color-coded q×r pel subarray, where q and r>1, and embedded in a raster color-coded domain of pels and for filling said ascertained polygon with a second color-coded q×r pel subarray, where q and r>1, comprising the steps of:

(a) identifying the first color-coded pel subarray;

(b) determining all unique raster runs of said identified first pel subarray and creating a counterpart data representation thereof by:

(1) ascertaining connected regions within the domain exhibiting said first pel subarray and forming a location list thereof by traversing the domain from an arbitrary point therein, said traverse being selected from a set consisting of a depth-first search and a nonrecursive traverse as if each unique run were a labeled node of a connected graph; and (2) at the point in the traverse where it is ascertained that a domain region is not connected, resolving the boundary by comparing the pels of the first subarray in high resolution of at least one pel at a time with pels in the domain local to the connected and unconnected regions and amending the location list accordingly, the number of pels at a time in said high resolution comparison being less than that used for any coarse resolution; and (c) filling in at least a portion of the raster color-coded domain with the second subarray according to the data representation.

2. In a system comprising a raster display, an input device, a buffer for periodically refreshing the display, and a processor coupling said display device and buffer; the processor being responsive to the input device for altering the buffer contents; the buffer containing a raster color-coded n×m pel domain embedded with at least one closed polygon formed from contiguous raster runs, each run being selected from one of q rows of a first color-coded q×r pel subarray; each run being a rational number multiple of r pels in length, q and r>1;

a method for ascertaining the polygon shape and for filling the ascertained shape with contiguous raster runs selected from q rows of a second color-coded q×r pel subarray; comprising the steps of:

(a) identifying the first subarray;

(b) ascertaining contiguous raster runs in the domain by matching selected ones of the q rows in said first q×r pel subarray in either a recursively descending or nonrecursive manner by comparing domain color-coded pels in a raster scan line direction with q pels of a given row in the first subarray and continuing the comparison of q pels at a time if equal, and upon mismatch, continuing the comparison on a one-pel-at-a-time basis to determine the extent of the match, a pel mismatch being indicative of the end of a run, and forming a list identifying each run by domain location and length; and (c) filling in at least a portion of the domain with contiguous raster runs formed from a rational number of multiples of r pels of a predetermined one of q rows of the second q×r pel subarray, the replication and positioning of the runs constituting the fill in the domain being made according to the list location and length.

3. The method according to claim 2, wherein the first and second pel subarrays each comprise a q×r array in which each one of q rows contains r pels of selectably distinguishable color value.

* * * * *